(12) United States Patent
Iwamatsu

(10) Patent No.: US 10,120,730 B2
(45) Date of Patent: Nov. 6, 2018

(54) LOAD CONTROL DEVICE AND LOAD CONTROL METHOD

(71) Applicant: NEC Corporation, Minato-ku, Tokyo (JP)

(72) Inventor: Yosuke Iwamatsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 113 days.

(21) Appl. No.: 15/116,284

(22) PCT Filed: Feb. 16, 2015

(86) PCT No.: PCT/JP2015/000689
§ 371 (c)(1),
(2) Date: Aug. 3, 2016

(87) PCT Pub. No.: WO2015/125453
PCT Pub. Date: Aug. 27, 2015

(65) Prior Publication Data
US 2017/0017526 A1    Jan. 19, 2017

(30) Foreign Application Priority Data
Feb. 18, 2014    (JP) .................................. 2014-028456

(51) Int. Cl.
*G06F 9/46* (2006.01)
*G06F 9/50* (2006.01)

(52) U.S. Cl.
CPC .................................. *G06F 9/5083* (2013.01)

(58) Field of Classification Search
None
See application file for complete search history.

(56) References Cited

U.S. PATENT DOCUMENTS

2009/0319687 A1* 12/2009 Goldstein ............. G06F 9/5083
709/241
2010/0153363 A1    6/2010 Suzuki et al.
2014/0289568 A1    9/2014 Koyama et al.

FOREIGN PATENT DOCUMENTS

| JP | 2010-140357 A | 6/2010 |
| JP | 2012-043409 A | 3/2012 |
| WO | 2013/069191 A1 | 5/2013 |

OTHER PUBLICATIONS

International Search Report for PCT Application No. PCT/JP2015/000689, dated Apr. 7, 2015.
(Continued)

*Primary Examiner* — Wissam Rashid

(57) ABSTRACT

The present invention provides an information processing device to efficiently execute a plurality of analysis engines on a plurality of analysis processing devices. The information processing device includes an arrangement control means that determines an arrangement pattern indicating connection between a plurality of data distribution devices and a plurality of controlled information processing devices based on cost information indicating price values of operation of a load control executing means regarding data processing and a dynamic load control means that connects the data distribution device to the controlled information processing device based on the arrangement pattern and controls start and stop of operation of the load control executing means based on the cost information and a load status of the controlled information processing device.

11 Claims, 20 Drawing Sheets

(56) References Cited

OTHER PUBLICATIONS

English translation of Written opinion for PCT Application No. PCT/JP2015/000689.

* cited by examiner

Fig.3

|  | ANALYSIS ENGINE a 203 | ANALYSIS ENGINE b 205 |
|---|---|---|
| DATA DISTRIBUTION DEVICE 110 | VALID | VALID |
| DATA DISTRIBUTION DEVICE 120 | VALID | INVALID |
| DATA DISTRIBUTION DEVICE 130 | INVALID | VALID |

Fig.4

|  | LOAD AVERAGE | LOAD SHARING |
|---|---|---|
| DATA DISTRIBUTION DEVICE 110, ANALYSIS ENGINE a 203 | 150 | 50 |
| DATA DISTRIBUTION DEVICE 110, ANALYSIS ENGINE b 205 | 200 | 75 |
| DATA DISTRIBUTION DEVICE 120, ANALYSIS ENGINE a 203 | 150 | 50 |
| DATA DISTRIBUTION DEVICE 120, ANALYSIS ENGINE b 205 | 400 | 150 |

Fig.5

| | COST OF LOAD REDUCING MEANS 202 | COST OF LOAD SHARING MEANS 204 |
|---|---|---|
| DATA DISTRIBUTION DEVICE 110, ANALYSIS ENGINE a 203 | 1000 | INVALID |
| DATA DISTRIBUTION DEVICE 110, ANALYSIS ENGINE b 205 | INVALID | 10 |
| DATA DISTRIBUTION DEVICE 120, ANALYSIS ENGINE a 203 | 1000 | INVALID |
| DATA DISTRIBUTION DEVICE 120, ANALYSIS ENGINE b 205 | INVALID | 10 |

Fig.6

|  | PROCESSOR THROUGHPUT |
|---|---|
| ANALYSIS DEVICE 210 | 500 |
| ANALYSIS DEVICE 220 | 500 |

Fig.13

| COLUMN A | COLUMN B | COLUMN C | COLUMN D | COLUMN E | COLUMN F | COLUMN G | COLUMN H | COLUMN I | COLUMN J | COLUMN K |
|---|---|---|---|---|---|---|---|---|---|---|
| P1 | 210 | 110, 120, 130 | 1 | 0 | 0 | 0 | 0.11 | 0.0 | 33.9 | 33.9 |
| | | | 2 | 0 | 1 | 10 | 0.39 | 3.9 | | |
| | | | 3 | 0 | 2 | 20 | 0.48 | 9.6 | | |
| | | | 4 | 1 | 2 | 1020 | 0.02 | 20.4 | | |
| | | | 5 | 2 | 2 | 2020 | 0.00 | 0.0 | | |
| P2 | 220 | NONE | 1 | 0 | 0 | 0 | 1.0 | 0.0 | 0.0 | 27.4 |
| | 210 | 110, 120 | 1 | 0 | 0 | 0 | 0.50 | 0.0 | 24.9 | |
| | | | 2 | 1 | 1 | 10 | 0.47 | 4.7 | | |
| | | | 3 | 1 | 1 | 1010 | 0.02 | 20.2 | | |
| | | | 4 | 2 | 1 | 2010 | 0.00 | 0.0 | | |
| P3 | 220 | 130 | 1 | 0 | 0 | 0 | 0.74 | 0.0 | 2.5 | 9.2 |
| | | | 2 | 0 | 1 | 10 | 0.25 | 2.5 | | |
| | 210 | 110, 130 | 1 | 0 | 0 | 0 | 0.18 | 0.0 | 9.2 | |
| | | | 2 | 0 | 1 | 10 | 0.70 | 7.0 | | |
| | | | 3 | 1 | 2 | 20 | 0.11 | 2.2 | | |
| | | | 4 | 1 | 2 | 1020 | 0.00 | 0.00 | | |
| P4 | 220 | 120 | 1 | 0 | 0 | 0 | 0.00 | 0.0 | 0.0 | 7.0 |
| | | | 2 | 0 | 0 | 1000 | 0.88 | 0.0 | | |
| | 210 | 110 | 1 | 0 | 0 | 0 | 0.11 | 0.0 | 1.1 | |
| | | | 2 | 1 | 1 | 10 | 0.00 | 1.1 | | |
| | 220 | 120, 130 | 1 | 0 | 0 | 0 | 0.40 | 0.0 | 5.9 | |
| | | | 2 | 0 | 1 | 10 | 0.59 | 5.9 | | |
| | | | 3 | 1 | 1 | 1010 | 0.00 | 0.0 | | |

Fig. 17

| | LOAD REDUCING MEANS 202 | | LOAD SHARING MEANS 203 | |
|---|---|---|---|---|
| | COST | EFFECT | COST | EFFECT |
| DATA DISTRIBUTION DEVICE 110, ANALYSIS ENGINE a 203 | 1000 | 500 | INVALID | INVALID |
| DATA DISTRIBUTION DEVICE 110, ANALYSIS ENGINE b 205 | INVALID | INVALID | 10 | 10 |
| DATA DISTRIBUTION DEVICE 120, ANALYSIS ENGINE a 203 | 1000 | 1000 | INVALID | INVALID |
| DATA DISTRIBUTION DEVICE 120, ANALYSIS ENGINE b 205 | INVALID | INVALID | 10 | 5 |

| CONTROL LEVEL | LOAD PREDICTION VALUE |
|---|---|
| 1 | 350 |
| 2 | 250 |
| 3 | 190 |

41 LOAD CONTROL DEVICE

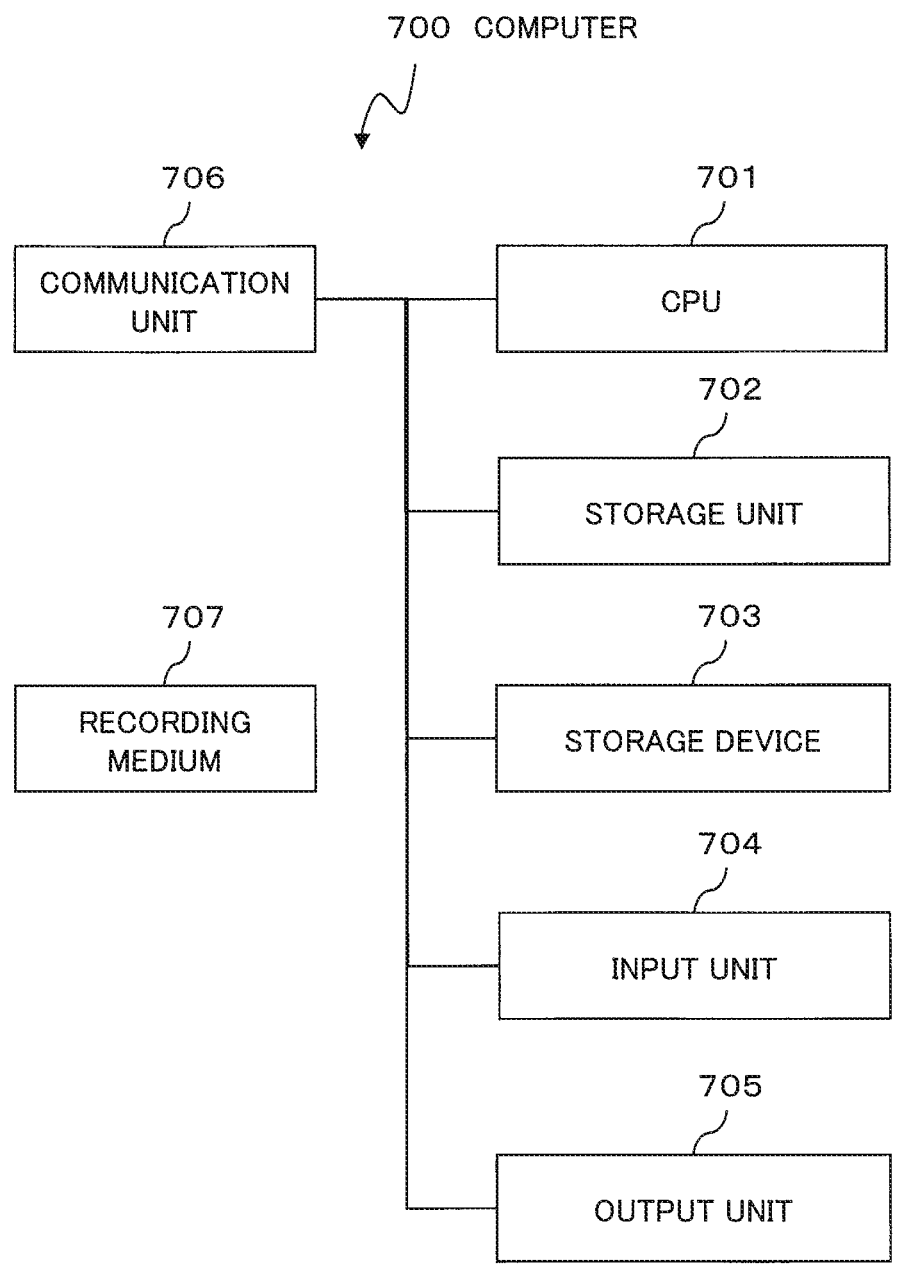

LOAD CONTROL DEVICE AND LOAD CONTROL METHOD

This application is a National Stage Entry of PCT/JP2015/000689 filed on Feb. 16, 2015, which claims priority from Japanese Patent Application 2014-028456 filed on Feb. 18, 2014, the contents of all of which are incorporated herein by reference, in their entirety.

TECHNICAL FIELD

The present invention relates to a load control technique of an information processing device.

BACKGROUND ART

With the advancement of information processing technology, analysis engines have recently been developed that analyze a variety of data. Such various analysis engines being developed may include an analysis engine that generates position information used to trace a human flow line from video picture data, an analysis engine that identifies a person from still picture data, and an analysis engine that generates text data from voice data.

Analysis control systems have also been developed that can obtain various analysis processing results from input data by way of a combination of a plurality of similar or dissimilar analysis engines. For example, systems have been developed that perform analysis processing where image data inputted from a camera is processed in parallel or serially by using a personality extraction engine, a flow line extraction engine, a face extraction engine, a face collation engine, and the like to determine a person of a predetermined behavior.

In this practice, an analysis control system including these analysis engines can be executed by a plurality of information processing devices. In this type of analysis control system with a plurality of analysis engines, it is desirable that a certain or higher level of accuracy of analysis results be guaranteed and that high-speed processing is made, for example, analysis results are outputted in real time.

However, in such an analysis system including a combination of the plurality of analysis engines as above-mentioned, load on each of the analysis engines varies substantially depending on the details of data to be analyzed.

As a result, a load of analysis processing may locally concentrate on a particular analysis engine. This may cause a delay in the analysis processing or data loss due to buffer overflow, thus resulting in failure to guarantee processing performance or accuracy of the entire analysis system.

In other words, a load on an analysis engine may cause an overload on the throughput of the information processing device using the analysis engine, thus resulting in an unintended delay in the analysis processing or an unintended data loss.

The above problems may be addressed by, for example, the following actions: an action of reducing data intentionally for analysis where the reduced data is unlikely to degrade the accuracy; another action of causing a delay intentionally in the processing via data buffering for analysis where a delay of a certain extent is permitted; and another action of sharing data frames to other information processing devices or other processors with an adequate margin of throughput, which do processing for analysis where the data frames segmented in terms of time can be executed in the instances of a plurality of analysis engines without affecting the results.

Patent Literature 1 discloses an exemplary computer implementation method for processing a data stream in the above analysis control system.

The computer implementation method described in Patent Literature 1 includes the following steps. A first step receives a tuple of attributes from among the data streams to be processed. A second step calculates the estimated processing time to process the tuple. A third step, once the estimated processing time is determined to exceed a threshold time, selectively removes, delays or executes on an alternative information processing device the tuple in order to reduce the influence of the delay in the processing.

Patent Literature 2 discloses an exemplary stream data processing system to attain optimization that equalizes the load between a plurality of information processing devices in charge of executing analysis engines.

The stream data processing system described in Patent Literature 2 calculates time as a cost when transferring query processing in a first place. Secondly, based on the calculated cost, the stream data processing system transfers the query processing to a predetermined information processing device in order to minimize the transfer time and equalize the load of the query processing on each server computer.

CITATION LIST

Patent Literature

[Patent Literature 1] Japanese Laid-open Patent Publication No. 2012-043409
[Patent Literature 2] Japanese Laid-open Patent Publication No. 2010-140357

SUMMARY OF INVENTION

Technical Problem

Note that the technique described in the aforementioned prior art literature has a problem in that it may fail to efficiently execute a plurality of analysis engines on a plurality of analysis processing devices.

The computer implementation method described in Patent Literature 1 focuses on the control to reduce load on individual information processing devices during execution. The computer implementation method does not consider optimization to equalize loads on a plurality of information processing devices executing analysis engines.

The stream data processing system described in the aforementioned Patent Literature 2 has a prerequisite that the instance of an analysis engine can be transferred to another information processing device for equalization of load between information processing devices. In other words, the stream data processing system does not consider an analysis engine of which the instance under analysis cannot be transferred to another information processing device.

In other words, the technique described in the aforementioned prior art literature fails to integratively consider the following points and to efficiently execute a plurality of analysis engines on a plurality of analysis processing devices in a case where the plurality of analysis engines include stateless analysis engines and stateful analysis engines. In this context, a stateless analysis engine refers to an analysis engine capable of sharing frames for later processing. A stateful analysis engine refers to an analysis engine without the frame sharing capability that relies on a fixed information processing device when executing analysis engines. The points to be considered are the requirements of accuracy of each analysis process, requirements of response performance, or traffic available for communications between information processing devices.

An object of the present invention is to provide an information processing device, a load control method and a program therefor or a computer-readable non-temporary recording medium storing the program that solve the above problems.

Solution to Problem

An information processing device according to an aspect of the present invention includes: an arrangement control means that determines an arrangement pattern indicating connection between a plurality of data distribution devices and a plurality of controlled information processing devices based on cost information indicating price values of operation of a load control executing means regarding data processing and a dynamic load control means that connects the data distribution device to the controlled information processing device based on the arrangement pattern and controls start and stop of operation of the load control executing means based on the cost information and the load status of the controlled information processing device.

A load control method, according to an aspect of the present invention, includes: determining an arrangement pattern indicating connection between a plurality of data distribution devices and a plurality of controlled information processing devices based on cost information indicating price values of operation of a load control executing means regarding data processing, connecting the data distribution device to the controlled information processing device based on the arrangement pattern, and controlling start and stop of operation of the load control executing means based on the cost information and the load status of the controlled information processing device.

A computer-readable non-transitory recording medium, according to an aspect of the present invention, records a program that causes a computer to determine an arrangement pattern indicating connection between a plurality of data distribution devices and a plurality of controlled information processing devices based on cost information indicating price values of operation of a load control executing means regarding data processing, connect the data distribution device to the controlled information processing device based on the arrangement pattern, and control start and stop of operation of the load control executing means based on the cost information and the load status of the controlled information processing device.

Advantageous Effects of Invention

The present invention has an effect of enabling a plurality of analysis engines to be executed on a plurality of analysis processing devices efficiently.

BRIEF DESCRIPTION OF DRAWINGS

FIG. 3 shows an example of analysis validation information stored in the analysis validation information management unit of the first exemplary embodiment.

FIG. 4 shows an example of analysis load information stored in the analysis load information management unit of the first exemplary embodiment.

FIG. 5 shows an example of cost information stored in the cost information management unit of the first exemplary embodiment.

FIG. 6 shows an example of resource information stored in the analysis device resource information management unit of the first exemplary embodiment.

FIG. 13 is a chart showing an example of specific calculation values calculated by the arrangement determining unit of the first exemplary embodiment.

FIG. 17 shows an example of cost information and effect information stored in a cost information management unit of the second exemplary embodiment.

FIG. 22 is a block diagram showing a hardware configuration of a computer to implement the load control device according to the fourth exemplary embodiment of the present invention.

DESCRIPTION OF EMBODIMENTS

Figure 1:
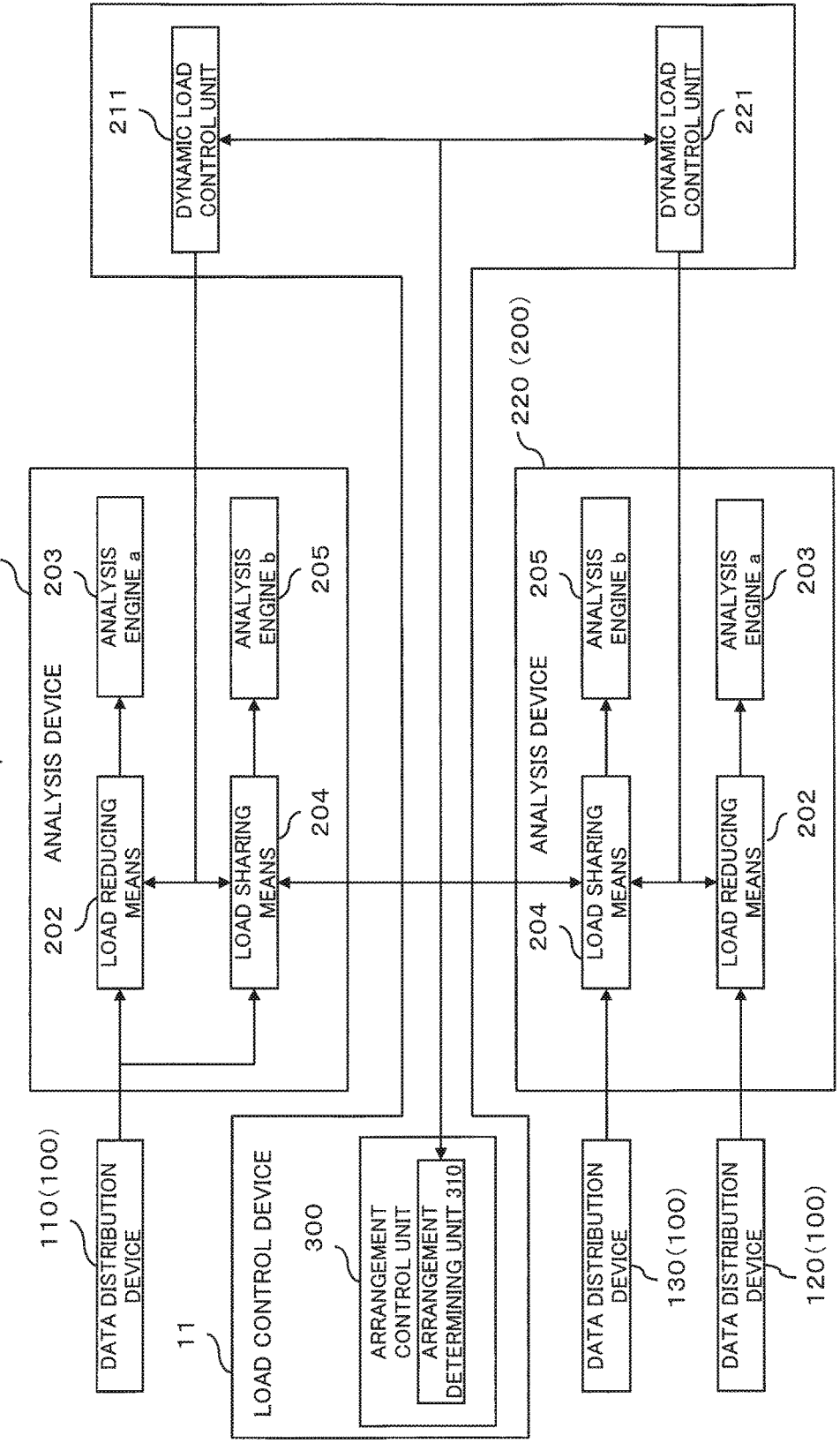
FIG. 1 is a block diagram showing a configuration of an analysis processing system including a load control device according to a first exemplary embodiment of the present invention.

Exemplary embodiments to implement the present invention will be detailed referring to drawings. Throughout the exemplary embodiments shown in the drawings or described herein, the same components are given the same signs and corresponding explanation is omitted as appropriate.

First Exemplary Embodiment

FIG. 1 is s block diagram showing a configuration of an analysis processing system 10 including a load control device 11 according to a first exemplary embodiment of the present invention.

As shown in FIG. 1, the analysis processing system 10 includes a data distribution device 110, a data distribution device 120, a data distribution device 130, an analysis device (also referred to as a controlled information processing device) 210, an analysis device 220 and an arrangement control unit 300. In the description that follows, the data distribution device 110, the data distribution device 120 and the data distribution device 130 may be generically termed a data distribution device 100. The analysis device 210 and the analysis device 220 may be generically termed the analysis device 200.

The analysis device 210 includes a load reducing means 202, a load sharing means 204, an analysis engine a (also referred to as a processing means) 203, an analysis engine b (also referred to as a processing means) 205 and a dynamic load control unit 211. The analysis device 220 includes the load reducing means 202, the load sharing means 204, the analysis engine a 203, the analysis engine b 205 and the dynamic load control unit 221.

Regardless of the example of FIG. 1, the analysis processing system 10 may include an analysis device that does not include a set of the load reducing means 202 and the analysis engine a 203. The analysis processing system 10 may include an analysis device that does not include a set of the load sharing means 204 and the analysis engine b 205.

The load control device 11 according to this exemplary embodiment includes the dynamic load control unit 211, a dynamic load control unit 221 and an arrangement control unit 300.

As shown in FIG. 1, connections between components are as described below.

The dynamic load control unit 211, the dynamic load control unit 221 and the arrangement control unit 300 are connected to each other via an unillustrated interface.

The data distribution device 110 is connected to a load reducing means 202 and a load sharing means 204 of the analysis device 210 via an unillustrated interface. The data distribution device 120 is connected to the load reducing means 202 of the analysis device 220 via an unillustrated interface. The data distribution device 130 is connected to the load sharing means 204 of the analysis device 220 via an unillustrated interface.

The load reducing means 202 is connected to the analysis engine a 203 via an unillustrated interface. The load sharing means 204 is connected to the analysis engine b 205 via an unillustrated interface. The dynamic load control unit 211 is connected to the load reducing means 202 and the load sharing means 204 of the analysis device 210 via an unillustrated interface. The dynamic load control unit 221 is connected to the load reducing means 202 and the load sharing means 204 of the analysis device 220 via an unillustrated interface.

Further, the load sharing means 204 of the analysis device 210 and the load sharing means 204 of the analysis device 220 are connected to each other via an unillustrated interface.

===Data Distribution Device 100===
The data distribution device 100 transmits data to the analysis device 200 and receives the analysis results (processing results) of the data as a response.

===Analysis Device 200===
The analysis device 200 receives data from the data distribution device 100, executes analysis processing (also referred to as data processing) on the data and transmits a response (for example, the analysis results of the data).

===Dynamic Load Control Unit 211, Dynamic Load Control Unit 221===
Each of the dynamic load control unit 211 and the dynamic load control unit 221 connects the data distribution device 100 and the analysis device 200 based on the arrangement pattern (described later) determined by the arrangement control unit 300.

Each of the dynamic load control unit 211 and the dynamic load control unit 221 measures the processing load (also referred to as load status) each of the analysis device 210 and the analysis device 220. The processing load (load status) may be measured by, for example, the load reducing means 202 and the load sharing means 204, or by an unillustrated means of the analysis device 200.

Each of the dynamic load control unit 211 and the dynamic load control unit 221 controls start and stop of operation of the load control executing means based on the processing load status (also referred to as load status) measured and cost information. Hereinafter, the operation of each of the dynamic load control unit 211 and the dynamic load control unit 221 to instruct start of operation of the load control means to cause the same to operate accordingly is also described as "the dynamic load control unit 211 or the dynamic load control unit 221 implements the load control means."

The load control executing means may be the load reducing means 202 or the load sharing means 204. "The operation to control start and stop of operation of the load control executing means" refers to "instructing the load reducing means 202 or the load sharing means 204 to start or stop operation." Hereinafter, operation of the dynamic load control unit 211 or the dynamic load control unit 221 to instruct start and stop of operation of the load reducing means 202 to cause the same to operate accordingly is also described as "the dynamic load control unit 211 or the dynamic load control unit 221 implements the load reducing means 202." Operation of the dynamic load control unit 211 or the dynamic load control unit 221 to instruct start and stop of operation of the load sharing means 204 to cause the same to operate accordingly is also described as "the dynamic load control unit 211 or the dynamic load control unit 221 implements the load sharing means 204."

In this context, the cost information is price values of operation of a load control executing means regarding the processing of data received from the data distribution device 100. For example, the price values are based on the accuracy of data processing results and the performance of a response to the requester of the data processing (data distribution device 100) assumed in cases where the load reducing means 202 is implemented. The price values are also based on the available traffic between the load sharing means 204 of each of the analysis device 210 and the analysis device 220 and the performance of a response to the requester of the data processing assumed in cases where the load sharing means 204 is implemented.

===Load Reducing Means 202===
The load reducing means 202 reduces the load of each analysis device 200 within the same. In particular, with respect to the data received from the data distribution device 100, the load reducing means 202 may reduce the load of data processing in the analysis engine a 203 by reducing a predetermined amount of data or buffering a predetermined amount of data to delay the processing. Note that the load reducing means 202 of each of the analysis device 210 and the analysis device 220 may be implemented for any number of data sets (a bunch of received data). In cases where the load reducing means 202 is implemented via hardware, each of the analysis device 210 and the analysis device 220 may include a plurality of load reducing means 202.

===Analysis Engine a 203===

The analysis engine a 203 is a stateful analysis engine that analyzes data received from the data distribution device 100.

===Load Sharing Means 204===

The load sharing means 204 reduces the load on a specific analysis device 200 by distributing the load to a plurality of analysis devices 200. In particular, with respect to the data received from the data distribution device 100, the load sharing means 204 transfers a predetermined amount of data to another analysis device 200 to cause the same to process the data. In this way, the load sharing means 204 reduces the data processing load on the analysis engine b 205 of the specific analysis device 200.

Note that the load sharing means 204 of each of the analysis device 210 and the analysis device 220 may be implemented for any number of data sets (a bunch of received data). In cases where the load sharing means 204 is implemented via hardware, each of the analysis device 210 and the analysis device 220 may include a plurality of load sharing means 204.

===Analysis Engine b 205===

The analysis engine b 205 is a stateless analysis engine that analyzes data received from the data distribution device 100.

===Arrangement control unit 300===

Figure 2:
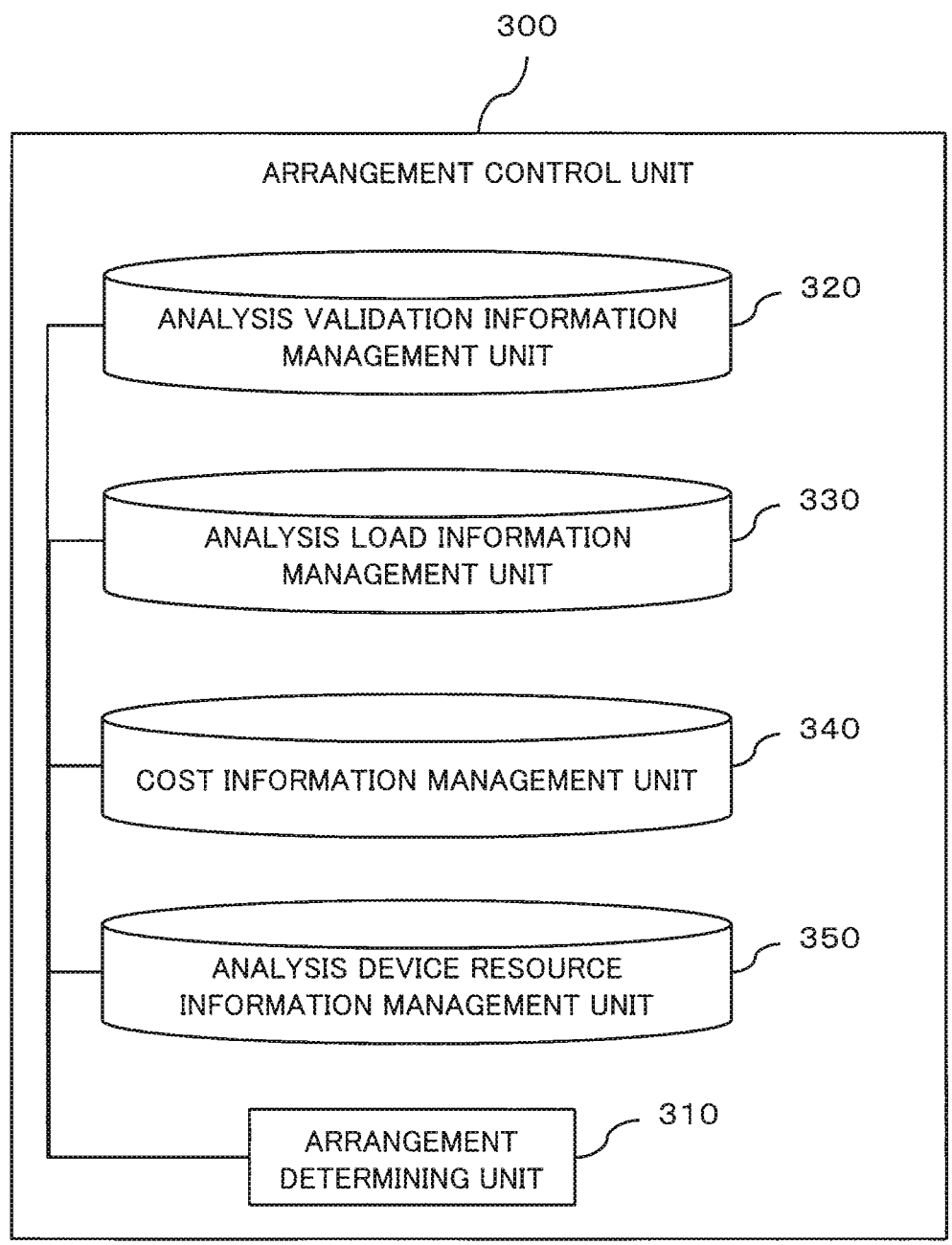
FIG. 2 is a block diagram showing a configuration of an arrangement control unit of the first exemplary embodiment.

FIG. 2 is a block diagram showing a configuration of an arrangement control unit 300.

As shown in FIG. 2, the arrangement control unit 300 includes an arrangement determining unit 310, an analysis validation information management unit 320, an analysis load information management unit 330, a cost information management unit 340, and an analysis device resource information management unit 350.

===Arrangement Determining Unit 310=

The arrangement determining unit 310 determines the optimum arrangement pattern of the data distribution device 110, the data distribution device 120 and the data distribution device 130 with respect to the analysis device 210 and the analysis device 220 based on the above cost information. In this context, the arrangement pattern shows a connection between the data distribution device 100 and the analysis device 200.

===Analysis Validation Information Management Unit 320===

The analysis validation information management unit 320 manages analysis validation information used to identify an analysis engine that executes analysis of data received from the data distribution device 100. The analysis validation information management unit 320 acquires the analysis validation information from an unillustrated means and stores the acquired analysis validation information.

FIG. 3 shows an example of analysis validation information stored in the analysis validation information management unit 320. The analysis validation information shown in FIG. 3 illustrates that the analysis engine a 203 and the analysis engine b 205 are executed on the data received from the data distribution device 110. The analysis validation information also illustrates that the analysis engine a 203 is executed on the data received from the data distribution device 120 and that the analysis engine b 205 is executed on the data received from the data distribution device 130.

===Analysis Load Information Management Unit 330===

The analysis load information management unit 330 manages load information used in cases where the analysis engine a 203 or the analysis engine b 205 is executed on the data received from each of the data distribution device 110, the data distribution device 120 and the data distribution device 130. The analysis load information management unit 330 acquires the load information from an unillustrated means and stores the acquired load information.

FIG. 4 shows an example of load information stored in the analysis load information management unit 330. The load information shown in FIG. 4 indicates an average of load and load sharing using a value that represents in milliseconds the required time assumed in cases where analysis processing is executed on the unit time data by a single processor. For example, the second row of the chart shown in FIG. 4 indicates that execution of the analysis engine a 203 on one-second data received from the data distribution device 110 takes an average of 150 milliseconds per processor and its sharing is "50".

The load average or sharing value may be, for example, a value calculated from the measurement value of performance of analysis processing executed by the analysis engine a 203 and the analysis engine b 205. Alternatively, the load average or sharing value may be a value calculated based on a theoretical value.

===Cost Information Management Unit 340===

The cost information management unit 340 manages cost information assumed when each of the load reducing means 202 and the load sharing means 204 operates in cases where the analysis engine a 203 or the analysis engine b 205 is executed on the data received from the data distribution device 100. The cost information management unit 340 acquires the cost information from an unillustrated means and stores the acquired cost information.

The cost information assumed in cases where the load reducing means 202 operates may be specified based on a drop in the accuracy of analysis processing made in cases where a predetermined amount of data is reduced from the data received from the data distribution device 100. The cost information may also be specified based on a drop in the performance of a response to the data distribution device 100 assumed in cases where a predetermined amount of data out of the data received from the data distribution device 100 is buffered to delay the processing.

The cost information of the load sharing means 204 may be specified based on a traffic load or a delay in communications between analysis devices 200 assumed in cases where a predetermined amount of data out of the data received from the data distribution device 100 is transferred to another analysis device 200 to cause the same to process the data.

FIG. 5 shows an example of cost information stored in the cost information management unit 340. The cost information shown in FIG. 5 represents the costs of the above-mentioned load reducing means 202 and load sharing means 204 as a relative value. FIG. 5 shows that a lower cost information value is specified for a load reducing means 202 or a load sharing means 204 that is desirably used in precedence. FIG. 5 also shows that a higher cost information value is specified for a load reducing means 202 or a load sharing means 204 that is desirably not used in precedence.

For example, the second row of the chart shown in FIG. 5 indicates that the cost information related to operation of the load reducing means 202 is "1000" in cases where analysis by the analysis engine a 203 is executed on the data received from the data distribution device 110. The third row of the chart shown in FIG. 5 indicates that the cost information related to operation of the load sharing means 204 is "10" in cases where analysis by the analysis engine b 205 is executed on the data received from the data distribution device 110. In other words, this indicates that the load sharing means 204 is desirably executed in precedence on the data received from the data distribution device 110.

The cost information of each of the load reducing means 202 and the load sharing means 204 may be, for example, a value calculated from a drop in the accuracy of analysis processing or a drop in the performance of a response to the data distribution device 100 measured when the load reducing means 202 is executed. The cost information may also be, for example, a value calculated from the value of a traffic load or a delay in communications between analysis devices 200 measured when the load sharing means 204 is executed. Alternatively, the cost information may be a value calculated based on a theoretical value.

For a combination of the data distribution device 100, the analysis engine a 203 and the analysis engine b 205 where the load reducing means 202 is not executed, the cost information of the load reducing means 202 is represented as, for example, "Invalid". Similarly, for a combination of the data distribution device 100, the analysis engine a 203 and the analysis engine b 205 where the load sharing means 204 is not executed, the cost information of the load sharing means 204 is also represented as, for example, "Invalid".

===Analysis Device Resource Information Management Unit 350===

The analysis device resource information management unit 350 manages the resource information of each of the analysis device 210 and the analysis device 220. The analysis device resource information management unit 350 acquires the resource information from an unillustrated means and stores the acquired resource information.

FIG. 6 shows an example of the resource information stored in the analysis device resource information management unit 350. FIG. 6 represents processor throughput of each of the analysis device 210 and the analysis device 220 as a processing execution time (milliseconds) in each of the entire analysis device 210 and entire analysis device 220 per unit time.

For example, if each analysis device 200 includes eight processors, the processing execution time of each entire analysis device 200 per second is 8000 milliseconds. If each analysis device 200 includes one processor, and each processor in each analysis device 200 has half a processing performance of a reference processor, the processing execution time of each entire analysis device 200 per second is 500 milliseconds. Processor throughput shown in FIG. 6 may be the latter case, for example.

The processor throughput value may be, for example, a value calculated from the measurement data of performance of analysis processing executed by each of the analysis device 210 and the analysis device 220 measured by each of the analysis device 210 and the analysis device 220. The processor throughput value may be a value calculated based on a theoretical value.

Figure 7:
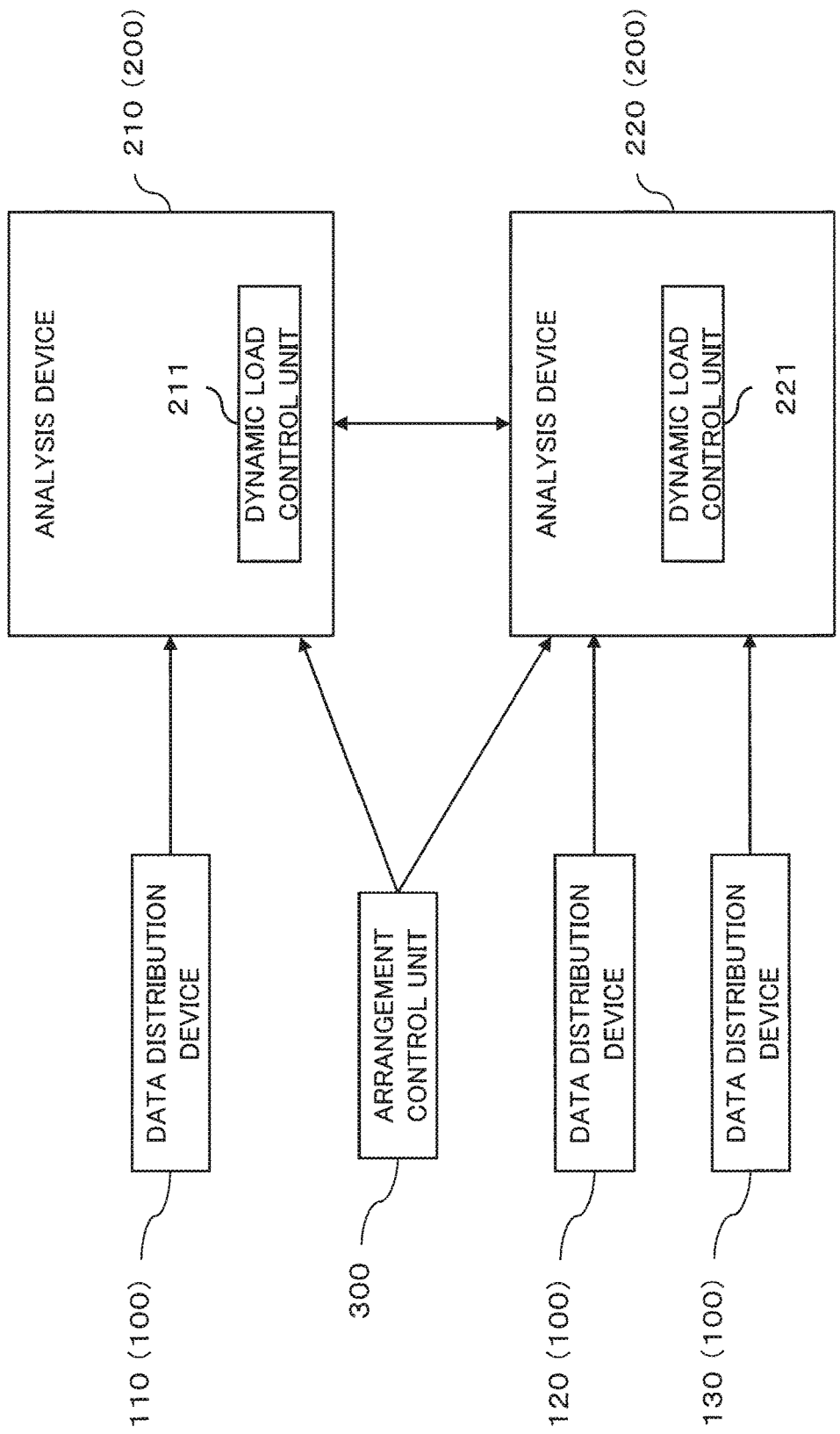
FIG. 7 shows an example of the analysis processing system assumed when a dynamic load control unit has connected a data distribution device and an analysis device based on an arrangement pattern of the first exemplary embodiment.
Figure 8:
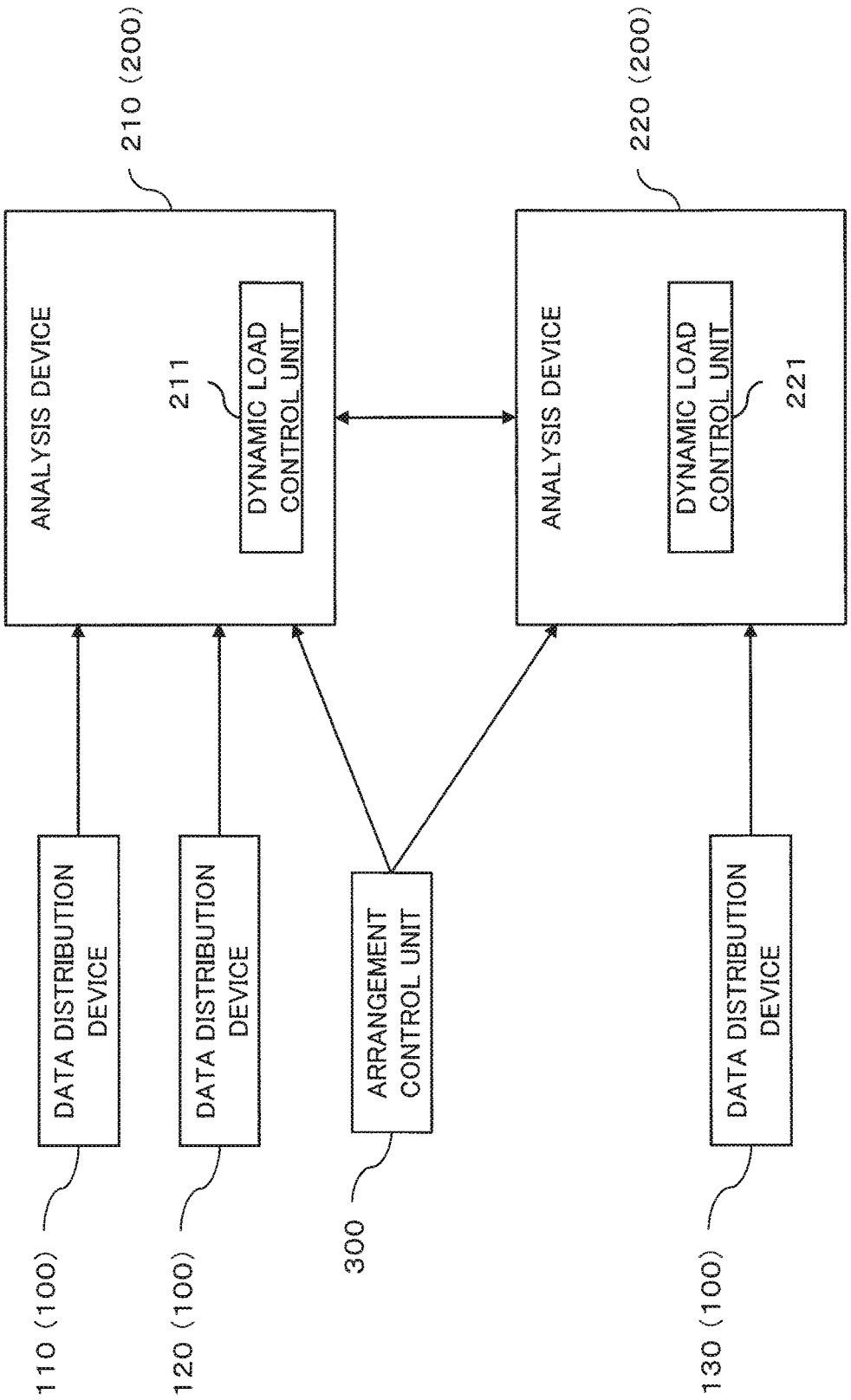
FIG. 8 shows another example of the analysis processing system assumed when the dynamic load control unit has connected the data distribution device and the analysis device based on an arrangement pattern of the first exemplary embodiment.

FIG. 7 and FIG. 8 each show an example of the analysis processing system 10 where the dynamic load control unit 211 and the dynamic load control unit 221 have connected the data distribution device 100 and the analysis device 200 to each other based on the arrangement pattern determined by the arrangement control unit 300.

Referring to FIG. 7, the data distribution device 110 is connected to the analysis device 210 and the data distribution device 120 and the data distribution device 130 are connected to the analysis device 220. In other words, FIG. 7 shows the state where the dynamic load control unit 211 has assigned the data distribution device 110 to the analysis device 210 and has assigned the data distribution device 120 and the data distribution device 130 to the analysis device 220 based on the arrangement pattern determined by the arrangement control unit 300.

Referring to FIG. 8, the data distribution device 110 and the data distribution device 120 are connected to the analysis device 210 and the data distribution device 130 and the analysis device 220 are connected to each other. In other words, FIG. 8 shows the state where the dynamic load control unit 221 has assigned the data distribution device 110 and the data distribution device 120 to the analysis device 210 and has assigned the data distribution device 130 to the analysis device 220 based on the arrangement pattern determined by the arrangement control unit 300.

Connection between the data distribution device 110, the data distribution device 120 and the data distribution device 130, and the analysis device 210 and the analysis device 220 (arrangement pattern) is not limited to the connections shown in FIG. 7 and FIG. 8 but may take any other connection forms.

Next, operation of the exemplary embodiment will be detailed referring to the drawings.

===General Operation of the Load Control Device 11===

Figure 9:
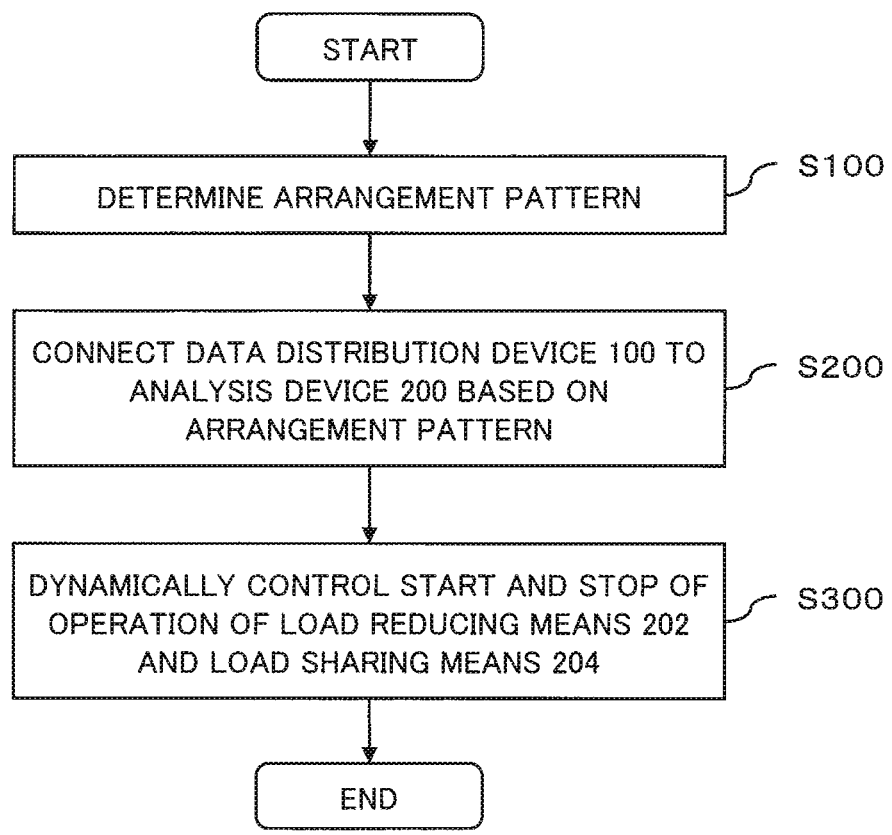
FIG. 9 is a flowchart showing the operation of the load control device of the first exemplary embodiment.

FIG. 9 is a flowchart showing a general operation of the load control device 11 in the exemplary embodiment. Processing in this flowchart can be executed based on the program control by the CPU (Central Processing Unit) 701 described later. A processing step name uses a symbol, such as S100.

The arrangement determining unit 310 determines an arrangement pattern of a plurality of data distribution devices 100 and a plurality of analysis devices 200 (step S100).

Next, each of the dynamic load control unit 211 and the dynamic load control unit 221 connects the data distribution device 100 and the analysis device 200 to each other based on the determined arrangement pattern (step S200).

Once step S200 is executed, the analysis device 200 receives data from the data distribution device 100 and analyzes the received data.

Next, each of the dynamic load control unit 211 and the dynamic load control unit 221 dynamically controls start and stop of operation of the load reducing means 202 and the load sharing means 204 during analysis (step S300).

===Operation of the Arrangement Determining Unit 310===

Figure 10:
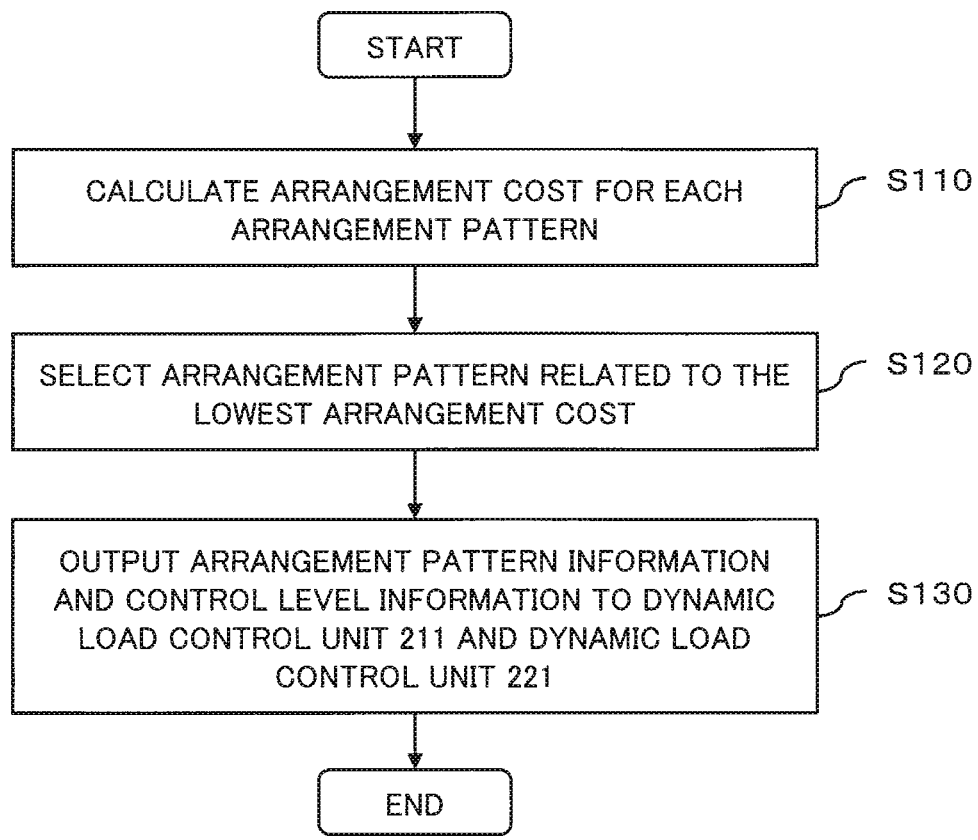
FIG. 10 is a flowchart showing the operation of an arrangement determining unit of the first exemplary embodiment.
Figure 11:
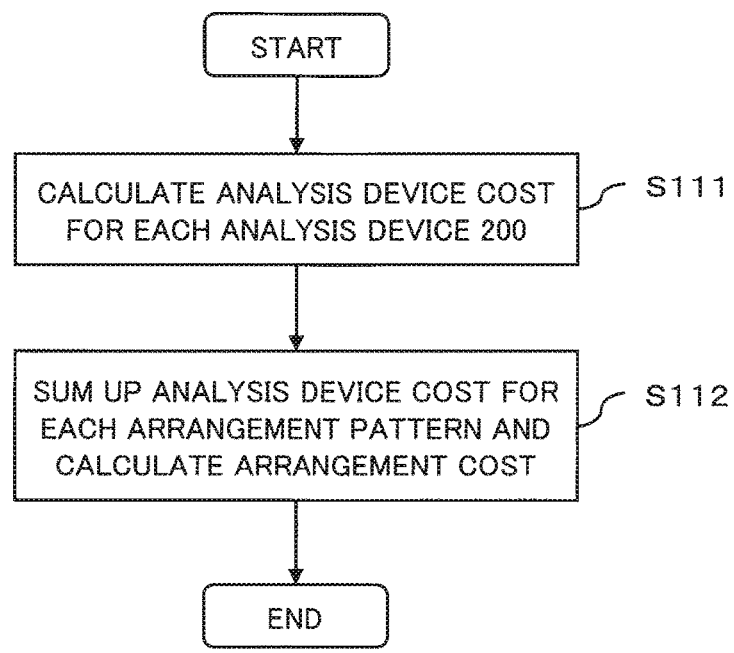
FIG. 11 is a flowchart showing the operation of the arrangement determining unit of the first exemplary embodiment.
Figure 12:
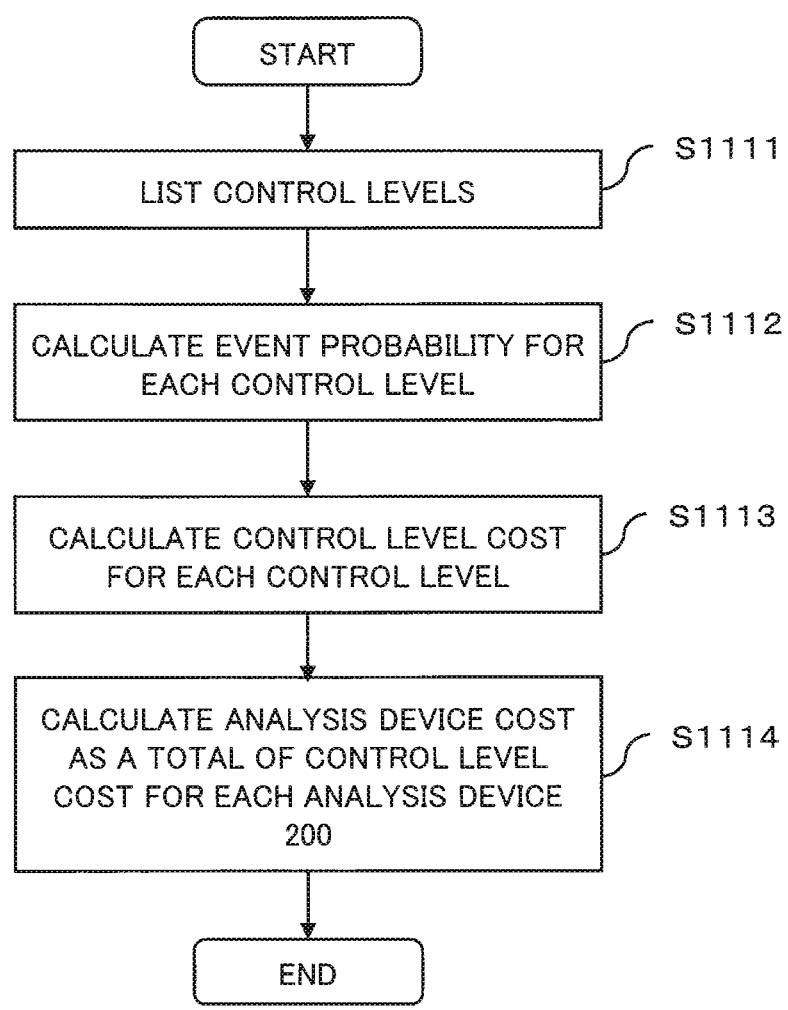
FIG. 12 is a flowchart showing the operation of the arrangement determining unit of the first exemplary embodiment.

FIGS. 10 to 12 are flowcharts showing the operation by which the arrangement determining unit 310 determines the arrangement pattern. In other words, FIGS. 10 to 12 are flowcharts showing the details of step S100 shown in FIG. 9.

By way of the operation shown in FIGS. 10 to 12, the arrangement determining unit 310 selects (determines) an arrangement pattern with the lowest cost for a plurality of data distribution devices 100 and a plurality of analysis devices 200 based on the cost information of the load reducing means 202 and the cost information of the load sharing means 204.

FIG. 13 is a chart indicating an example of specific calculation values of the control level cost, the analysis device cost and the arrangement cost calculated by the arrangement determining unit 310 via the operation shown in FIGS. 10 to 12. The calculation values indicated in FIG. 13 are related to the arrangement patterns assumed in cases where the arrangement control unit 300 retains information shown in FIGS. 3 to 6.

Column A of FIG. 13 indicates the identifiers of arrangement patterns. Hereinafter, for example, the arrangement pattern "A" indicates an arrangement pattern whose identifier is "A".

Column B of FIG. 13 indicates each of the analysis device 210 and the analysis device 220 by using the signs shown in FIG. 1. Column C of FIG. 13 indicates the data distribution device 100 connected to the analysis device 200 indicated in Column B in the arrangement pattern indicated in Column A by using signs shown in FIG. 1.

Column D of FIG. 13 indicates level values of control level. A control level is assigned based on the corresponding cost (Column G of FIG. 13) described later. In particular, the smaller the corresponding cost is, the smaller level value is assigned, and the larger the corresponding cost is, the larger level value is assigned. Hereinafter, "a large level value of control level" and "a small level value of control level" may be respectively referred to as "a high control level" and "a low control level". In other words, a control level becomes higher as its level value increases and becomes lower as its level value decreases. Hereinafter, for example, a control level "0" indicates a control level whose level value is "0".

In other words, the control level is related to each of the combinations of the number of load reducing means 202 to be executed and the number of load sharing means 204 to be executed in each of the analysis devices 200.

Column E of FIG. 13 indicates the number of load reducing means 202 to be executed that is related to each control level. Column F of FIG. 13 indicates the number of load sharing means 204 to be executed that is related to each control level. Hereinafter, for example, the number of implemented load reducing means of "1" indicates that the number of load reducing means 202 to be simultaneously executed is "1". Similarly, the number of implemented load sharing means of "2" indicates that the number of load sharing means 204 to be simultaneously executed is "2".

Column G of FIG. 13 indicates a corresponding cost as a cost related to each control level. The corresponding cost is a total cost of load reducing means 202 and load sharing means 204 to be executed for each combination thereof (control level).

Column H of FIG. 13 indicates an event probability related to each control level. Hereinafter, for example, an event probability of "0.3" indicates that the event probability is "0.3".

Column I of FIG. 13 indicates a control level cost as a cost related to each control level. Hereinafter, for example, a control level cost of "4" indicates that the control level cost is "4".

Column J of FIG. 13 indicates an analysis device cost as a cost related to each analysis device 200. Hereinafter, for example, an analysis device cost of "5" indicates that the analysis device cost is "5".

Column K of FIG. 13 indicates an arrangement cost value as a cost related to each arrangement pattern. Hereinafter, for example, an arrangement cost of "10" indicates that the arrangement cost is "10".

In FIG. 10, the arrangement determining unit 310 calculates an arrangement cost for each arrangement pattern with a plurality of data distribution devices 100 and a plurality of analysis devices 200 (step S110).

Here, calculating operation of an arrangement cost by the arrangement determining unit 310 in Step S110 will be detailed referring to FIG. 11.

In FIG. 11, the arrangement determining unit 310 calculates an analysis device cost for each analysis device 200 (step S111).

Here, calculating operation of an analysis device cost by the arrangement determining unit 310 in Step S111 will be detailed referring to FIG. 12.

In FIG. 12, the arrangement determining unit 310 lists control levels in the analysis device 200 (step S1111).

For example, the arrangement determining unit 310 assumes as control level 1 a combination where neither load reducing means 202 nor load sharing means 204 are executed and as control level 2 a case where either a load reducing means 202 or a load sharing means 204 with the lowest cost information value is executed. Further, the arrangement determining unit 310 assumes as control level 3 a case where either a load reducing means 202 or a load sharing means 204 with the lowest cost information value and either a load reducing means 202 or a load sharing means 204 with the second-lowest cost information value are executed. Similarly, the arrangement determining unit 310 lists control levels of all combinations of load reducing means 202 and load sharing means 204 to be executed.

An example of control level in each analysis device 200 for each arrangement pattern is indicated in Column D of FIG. 13.

As indicated in FIG. 13, for example, control levels "1" to "5" are listed in Column D for the analysis device 210 of the arrangement pattern "P1". For example, FIG. 13 indicates that control level "1" of the arrangement pattern "P1" in the analysis device 210 means the number of implemented load reducing means is "0", the number of implemented load sharing means is "0", and the corresponding cost is "0". FIG. 13 also indicates that control level "4" of the arrangement pattern "P1" in the analysis device 210 means the number of implemented load reducing means is "1", the number of implemented load sharing means is "2", and the corresponding cost is "1020".

Returning to FIG. 12, the arrangement determining unit 310 calculates an event probability for each of the listed control levels (step S1112).

For example, the arrangement determining unit 310 obtains the event probability of a particular control level as follows:

It is assumed that analysis load information stored in the analysis load information management unit 330 follows normal distribution. In this case, the control level load average and sharing are respectively a total of the average and total of sharing of the respective loads on the analysis engine a 203 and the analysis engine b 205 executed at respective control levels.

From the control level load average and sharing and the throughput of the analysis device 200 stored in the analysis device resource information management unit 304, a probability is calculated that does not exceed the control level. This calculation method is well known so that the corresponding explanation is skipped.

For example, the event probability of a control level is calculated using the following formula:

(Event probability of control level 0)=(Probability that does not exceed control level 0).

(Event probability of control level "L")=(Probability that does not exceed control level "L")−(Probability that does not exceed control level "L−1"). Here, L is an integer of "1" or more.

An example of event probability of each control level is indicated in Column H of FIG. 13.

Next, the arrangement determining unit 310 calculates a control level cost for each control level listed (step S1113). In particular, the arrangement determining unit 310 calculates, as a control level cost, a value that has undergone a specific arithmetic operation using an event probability related to each of the control levels for the corresponding cost related to each of the control levels.

For example, a control level cost is calculated using the following formula:

(Control level cost of control level "L")=(Event probability of control level "L")×(Corresponding cost of control level "L").

Here, L is an integer of "1" or more. Control level cost of control level "0" is "0" because the corresponding cost is "0".

An example of a control level cost for each control level is indicated in Column I of FIG. 13.

Next, the arrangement determining unit 310 sums up the control level cost for each analysis device 200 and calculates the analysis device cost (step S1114).

An example of an analysis device cost for each analysis device 200 is indicated in Column J of FIG. 13.

Returning to FIG. 11, the arrangement determining unit 310 then sums up the analysis device cost foe each arrangement pattern and calculates the arrangement cost (step S112).

An example of an arrangement cost for each arrangement pattern is indicated in Column K of FIG. 13.

Returning to FIG. 10, the arrangement determining unit 310 then selects the arrangement pattern related to the lowest arrangement cost (step S120). In FIG. 13, the arrangement determining unit 310 selects the arrangement pattern "P4".

Next, the arrangement determining unit 310 outputs the arrangement pattern information (Columns B and C of FIG. 13) and the control level information (Columns D, E, F and I of FIG. 13) related to the arrangement pattern "P4" to the dynamic load control unit 211 and the dynamic load control unit 221 (step S130).

===Operation of the Dynamic Load Control Unit 211 and the Dynamic Load Control Unit 221===

Figure 14:
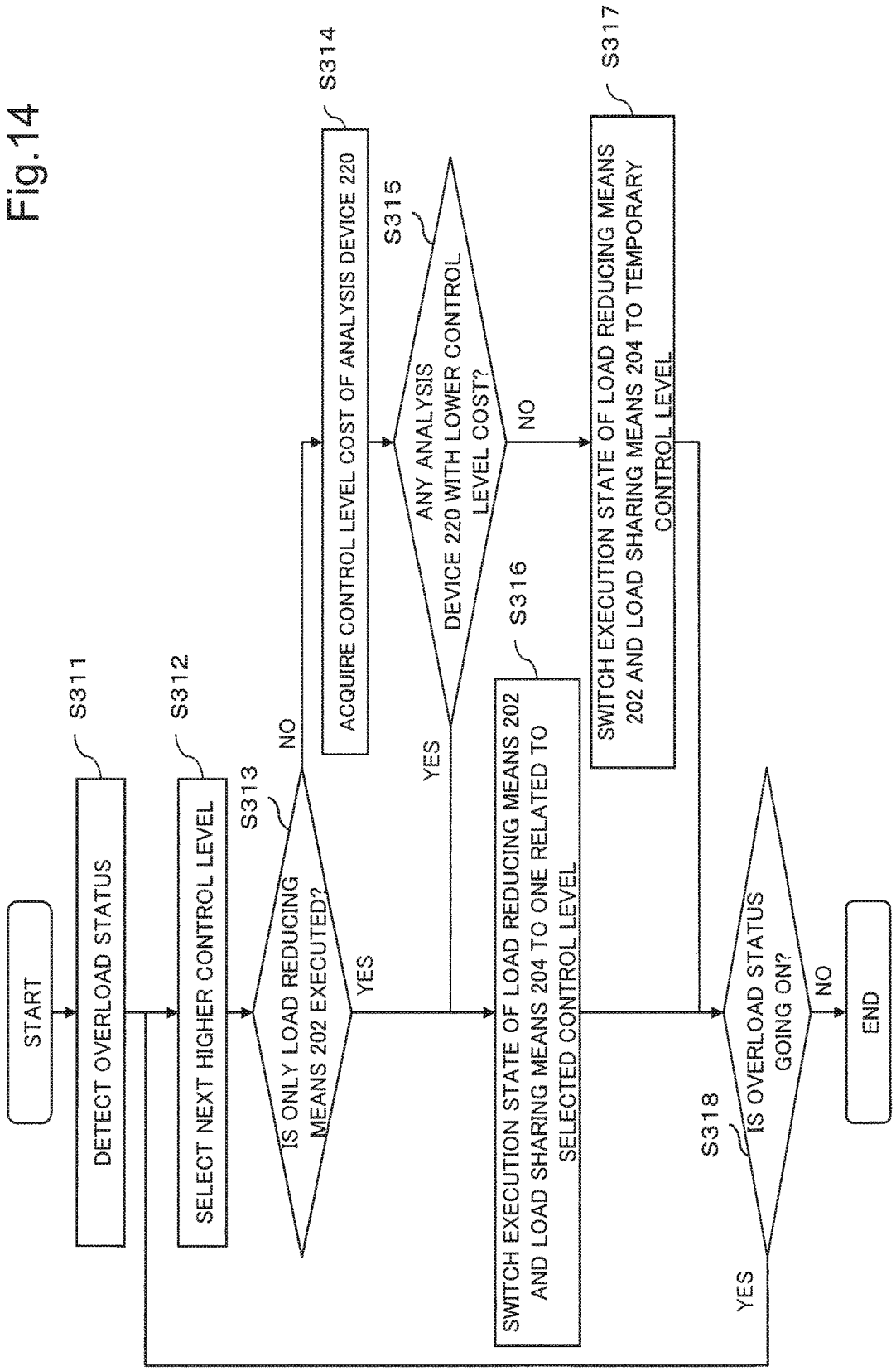
FIG. 14 is a flowchart showing the operation of the dynamic load control unit of the first exemplary embodiment.
Figure 15:
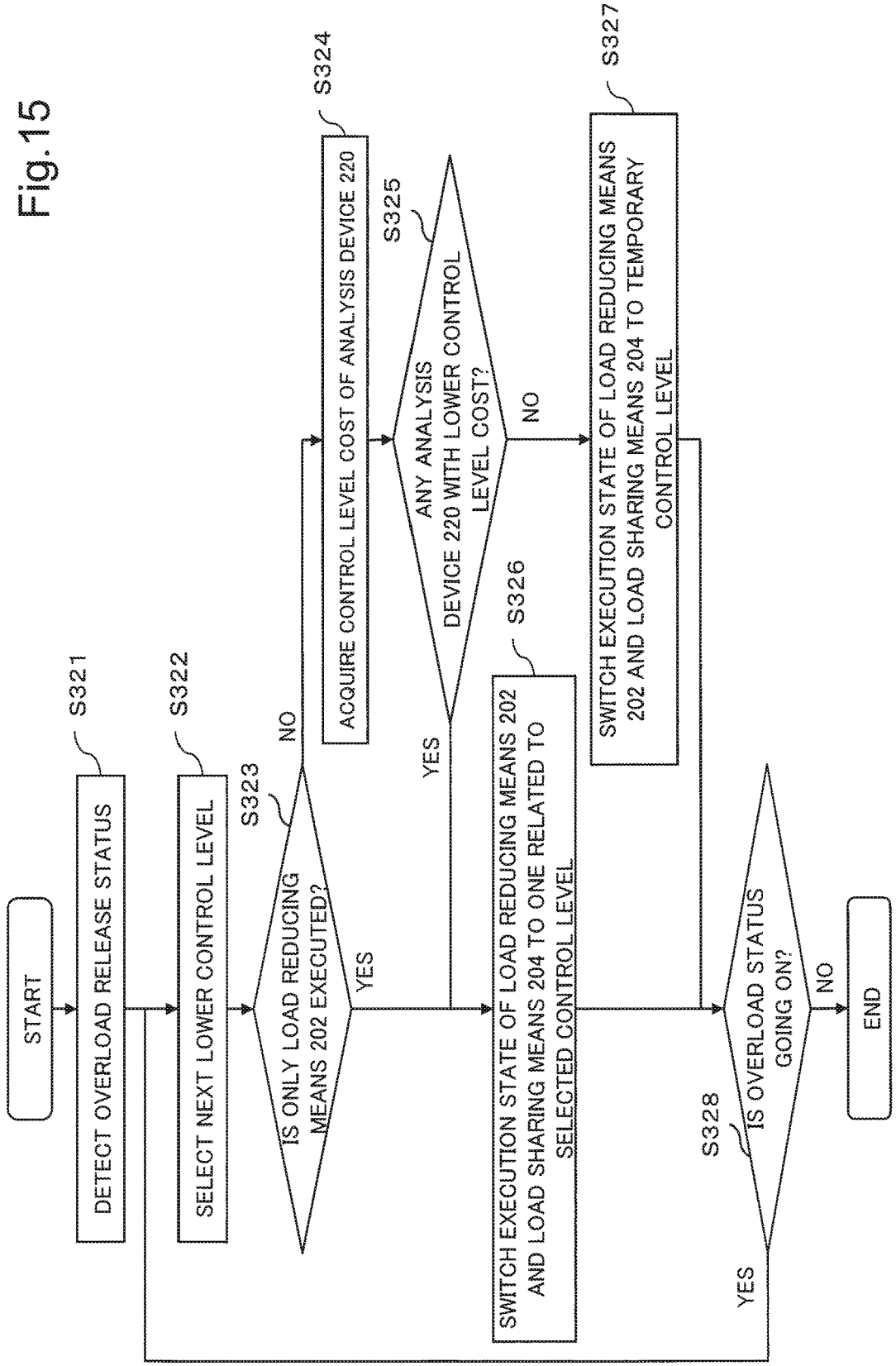
FIG. 15 is a flowchart showing the operation of the dynamic load control unit of the first exemplary embodiment.

FIGS. 14 and 15 are flowcharts showing the detailed operation of the dynamic load control unit 211 and the dynamic load control unit 221 in step S300 of FIG. 9.

FIG. 14 is a flowchart showing the operation by which each of the dynamic load control unit 211 and the dynamic load control unit 221 dynamically controls start and stop of the operation of the load reducing means 202 and the load sharing means 204 in accordance with a rise in the load on the analysis device 200.

In the description of FIGS. 14 and 15 that follows, the dynamic load control unit 211 and the dynamic load control unit 221 are simply described as the dynamic load control unit 211. In the description of FIG. 14 that follows, the dynamic load control unit 211 and the analysis device 210 may read the dynamic load control unit 221 and the analysis device 220, respectively. In this case, the dynamic load control unit 221 and the analysis device 220 should read the dynamic load control unit 211 and the analysis device 210, respectively.

The dynamic load control unit 211 measures the load on the analysis device 210 and detects that the analysis device 210 is in the overload status (step S311). For example, the dynamic load control unit 211 detects the overload status based on the overload threshold prespecified for each control level in case the value indicating the load status of the analysis device 210 becomes equal to or larger than an overload threshold related to the current control level.

Next, the dynamic load control unit 211 selects a control level next higher (with a higher level value) than the current control level (step S312). In cases where the current control level is the highest level, the dynamic load control unit 211 may terminate the operation.

Next, the dynamic load control unit 211 determines whether the control level selected in step S312 is one where only the load reducing means 202 is executed (step S313).

In cases where the selected control level is one where only the load reducing means 202 is executed ("Yes" in step S313), the dynamic load control unit 211 switches the execution state of the load control executing means to one related to the selected control level (step S316). In other words, the dynamic load control unit 211 instructs start or stop of operation for each of the load reducing means 202 and the load sharing means 204 so that the state related to the control level selected in step S312 will be reached.

Next, the dynamic load control unit 211 measures the load on the analysis device 210 and determines whether the overload status is going on (step S318).

In cases where the overload status is going on ("Yes" in step S318), the dynamic load control unit 211 returns to the operation in step S312. In cases where the overload status is not going on ("No" in step S318), the dynamic load control unit 211 terminates the operation.

In cases where the control level is not one where only the load reducing means 202 is executed ("No" in step S313), the dynamic load control unit 211 acquires the control level cost of the current control level from the analysis device 220 to the dynamic load control unit 221 (step S314).

Next, the dynamic load control unit 211 determines whether an analysis device 220 is present that is operating at a control level with a control level cost lower than one related to the selected control level (step S315).

In the presence of an analysis device 220 that is operating at a control level with a relatively lower control level cost ("Yes" in step S315), the dynamic load control unit 211 proceeds to the operation in step S316.

In the absence of an analysis device 220 that is operating at a control level with a relatively lower control level cost ("No" in step S315), the dynamic load control unit 211 switches the execution state of the load control executing means to one related to a temporary control level (step S317). The temporary control level is, among the selected control levels, one where the load sharing means 204 is omitted and only the load reducing means 202 is executed.

Next, the dynamic load control unit 211 proceeds to the operation in step S318.

FIG. 15 is a flowchart showing the operation by which each of the dynamic load control unit 211 and the dynamic load control unit 221 dynamically controls start and stop of the operation of the load reducing means 202 and the load sharing means 204 in accordance with a drop in the load on the analysis device 200.

The dynamic load control unit 211 measures the load on the analysis device 210 and detects that the analysis device 210 is in the overload release status (step S321). For example, the dynamic load control unit 211 detects the overload release status based on the overload release threshold prespecified for each control level in cases where the value indicating the load status of the analysis device 210 is below an overload release threshold related to the current control level. The overload release threshold related to a certain control level is a value smaller than the above-mentioned overload threshold related to the same control level. That is, in cases where a value indicating the load status of the analysis device 200 is equal to or larger than an overload release threshold and below an overload threshold, both thresholds related to a certain control level, the analysis device 200 becomes stable in the execution state (operating state) of the load control executing means related to the control level.

Next, the dynamic load control unit 211 selects a control level next lower (with a lower level value) than the current control level (step S322). In cases where the current control level is the lowest level, the dynamic load control unit 211 may terminate the operation.

Next, the dynamic load control unit 211 determines whether the control level selected in step S322 is one where only the load reducing means 202 is executed (step S323).

In cases where the selected control level is one where only the load reducing means 202 is executed ("Yes" in step S323), the dynamic load control unit 211 switches the execution state of the load control executing means to one related to the selected control level (step S326). In other words, the dynamic load control unit 211 instructs start or stop of operation for each of the load reducing means 202 and the load sharing means 204 so that the state related to the selected control level will be reached.

Next, the dynamic load control unit 211 measures the load on the analysis device 210 and determines whether the overload release status is going on (step S328).

In cases where the overload release status is going on ("Yes" in step S328), the dynamic load control unit 211 returns to the operation in step S322. In cases where the overload release status is not going on ("No" in step S328), the dynamic load control unit 211 terminates the operation.

In cases where the selected control level is not one where only the load reducing means 202 is executed ("No" in step S323), the dynamic load control unit 211 inquires from the dynamic load control unit 221 the current control level cost of the analysis device 220 (step S324).

Next, the dynamic load control unit 211 determines whether an analysis device 220 is present that is operating at a control level with a control level cost lower than one related to the selected control level (step S325).

In the presence of an analysis device 220 that is operating at a control level with a relatively lower control level cost ("Yes" in step S325), the dynamic load control unit 211 proceeds to the operation in step S326.

In the absence of an analysis device 220 that is operating at a control level with a relatively lower control level cost ("No" in step S325), the dynamic load control unit 211 switches the execution state of the load control executing means to one related to a temporary control level (step S327).

Next, the dynamic load control unit 211 proceeds to the operation in step S328.

The aforementioned first effect of the exemplary embodiment is that a plurality of analysis engines can be efficiently executed on a plurality of analysis processing devices.

The effect is provided by the following operations. First, the arrangement control unit 300 determines an arrangement pattern indicating connection between a plurality of data distribution devices 100 and a plurality of analysis devices 200 based on cost information. Secondly, the dynamic load control unit 211 and the dynamic load control unit 221 connects the data distribution device 100 to the analysis device 200 based on the arrangement pattern. Thirdly, the dynamic load control unit 211 and the dynamic load control unit 221 control start and stop of operation of the load reducing means 202 and the load sharing means 204 based on the cost information and the load status of the analysis device 200.

The aforementioned second effect of the exemplary embodiment is that a load on each analysis device 200 can be equalized even under the following conditions. A first condition is that each of the analysis devices 200 includes a mixture of an analysis engine a 203 (stateful analysis engine) and an analysis engine b 205 (stateless analysis engine). A second condition is a great variation in the processing load depending on the data content.

The second effect is provided because the arrangement control unit 300 determines an arrangement pattern based on an arrangement cost obtained by summing up the analysis device costs of the analysis device 200 for each arrangement pattern.

The aforementioned third effect of the exemplary embodiment is that a plurality of analysis engines a 203 and a plurality of analysis engines b 205 can be efficiently executed on a plurality of analysis devices 200 even under the following conditions. A first condition is that each of the analysis devices 200 includes a mixture of an analysis engine a 203 (stateful analysis engine) and an analysis engine b 205 (stateless analysis engine). A second condition is a great variation in the processing load depending on the data content.

The third effect is provided because the dynamic load control unit 211 and the dynamic load control unit 221 control start and stop of operation of the control executing means against variations in load by using cost information of the load control executing means that is based on the accuracy of processing results and response performance as well as traffic available between analysis devices 200.

The aforementioned fourth effect of the exemplary embodiment is that the load sharing means 204 is made operable in consideration of the load status of other analysis devices 200 in cases where analysis processing is distributed to the other analysis devices 200.

The fourth effect is provided because the dynamic load control unit 211 and the dynamic load control unit 221 cause the load sharing means 204 to start operation in the presence of an analysis device 220 operating at a control level with a control level cost lower than the analysis device cost of the selected control level.

Second Exemplary Embodiment

Next, a second exemplary embodiment of the present invention will be detailed referring to the drawings. Hereinafter, explanation overlapping the previous description is omitted as long as the explanation of the second exemplary embodiment remains clear.

Figure 16:
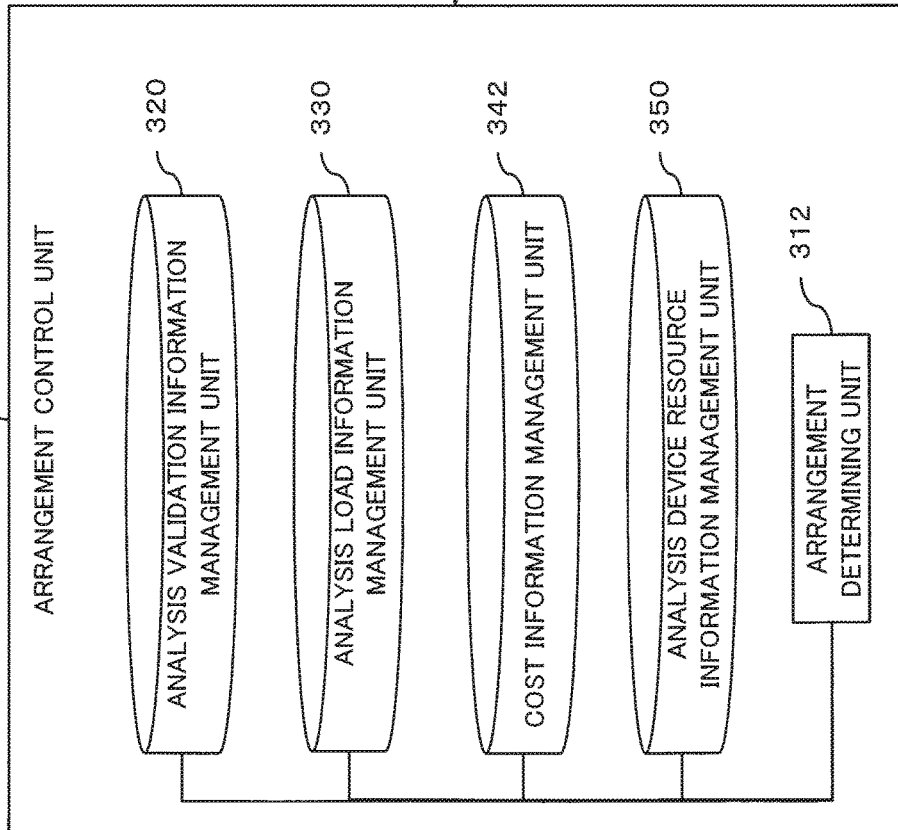
FIG. 16 is a block diagram showing a configuration of a load control device according to a second exemplary embodiment of the present invention.

FIG. 16 is a block diagram showing a configuration of a load control device 21 according to the second exemplary embodiment of the present invention.

As shown in FIG. 16, the load control device 21 of this exemplary embodiment differs from the load control device 11 of the first exemplary embodiment in that it includes an arrangement control unit 302 instead of an arrangement control unit 300. The load control device 21 of this exemplary embodiment may be included in the analysis processing system 10 shown in FIG. 1 instead of the load control device 11 shown in FIG. 1.

As shown in FIG. 16, the arrangement control unit 302 differs from the arrangement control unit 300 shown in FIG. 2 in that it includes a cost information management unit 342 instead of the cost information management unit 340 and an arrangement determining unit 312 instead of the arrangement determining unit 310.

===Cost Information Management Unit 342===

The cost information management unit 342 manages cost information and effect information used when each of the load reducing means 202 and the load sharing means 204 is executed in cases where the analysis engine a 203 or the analysis engine b 205 is executed on the data received from the data distribution device 100. The cost information management unit 342 acquires the cost information and effect information from an unillustrated means and stores the acquired cost information and effect information. The cost information is the same as that shown in FIG. 2.

Effect information used when the load reducing means 202 is executed may be specified based on, for example, the degree of a drop in the processing load attained by reducing of a predetermined amount of data out of the data received from the data distribution device 100. The effect is specified based on the degree of a drop in the processing load attained by buffering a predetermined amount of data out of the data received from the data distribution device 100 to delay the processing.

Effect information used when the load sharing means 204 is executed may be specified based on the degree of a drop in the processing load attained by transfer of a predetermined amount of data out of the data received from the data distribution device 100 to other analysis devices 200 for processing thereon.

FIG. 17 shows an example of cost information stored in the cost information management unit 342. The effect information shown in FIG. 17 represents the effect of the above-mentioned load reducing means 202 and load sharing means 204 as a relative value.

The effect information of the load reducing means 202 and the load sharing means 204 may be, for example, a value calculated from the value of the degree of a drop in the processing load measured when each of the load reducing means 202 and the load sharing means 204 is executed. Alternatively, the effect may be a value calculated based on a theoretical value and the like.

For a combination of the data distribution device 100 and the analysis engine a 203 where the load reducing means 202 is not executed, effect information related to the load reducing means 202 may be represented as "Invalid". Similarly, for a combination of the data distribution device 100 and the analysis engine b 205 where the load sharing means 204 is not executed, effect information related to the load sharing means 204 may also be represented as "Invalid".

===Arrangement Determining Unit 312===

The arrangement determining unit 312 determines a value calculated by summing up the cost effectiveness ratio of the load reducing means 202 to be executed and the cost effectiveness ratio of the load sharing means 204 to be executed for each control level, such that the value corresponds to cost in Column G of FIG. 13 (hereinafter referred to as corresponding cost effectiveness ratio). The cost effectiveness ratio is a value obtained by dividing a cost information value by an effect information value.

The arrangement determining unit 312 calculates the control level cost, the analysis device cost and the arrangement cost based on its corresponding cost effectiveness ratio.

In other words, the arrangement determining unit 312 differs from the arrangement determining unit 310 in that it uses the corresponding cost effectiveness ratio instead of the corresponding cost.

Operation of this exemplary embodiment is the same as the operation shown in FIGS. 9, 10, 11, 12, 14 and 15 except in that the arrangement determining unit 312 calculates the corresponding cost effectiveness ratio and uses the calculated corresponding cost effectiveness ratio instead of the corresponding cost.

The aforementioned effect of the exemplary embodiment is that the same effect as of the first exemplary embodiment is obtained even in the presence of load reducing means 202 or load sharing means 204 with a different degree of a drop in the processing load.

The effect is provided because the arrangement determining unit 312 uses the corresponding cost effectiveness ratio instead of the corresponding cost.

Third Exemplary Embodiment

Next, a third exemplary embodiment of the present invention will be detailed referring to the drawings. Hereinafter, explanation overlapping the previous description is omitted as long as the explanation of this exemplary embodiment remains clear.

Figure 18:
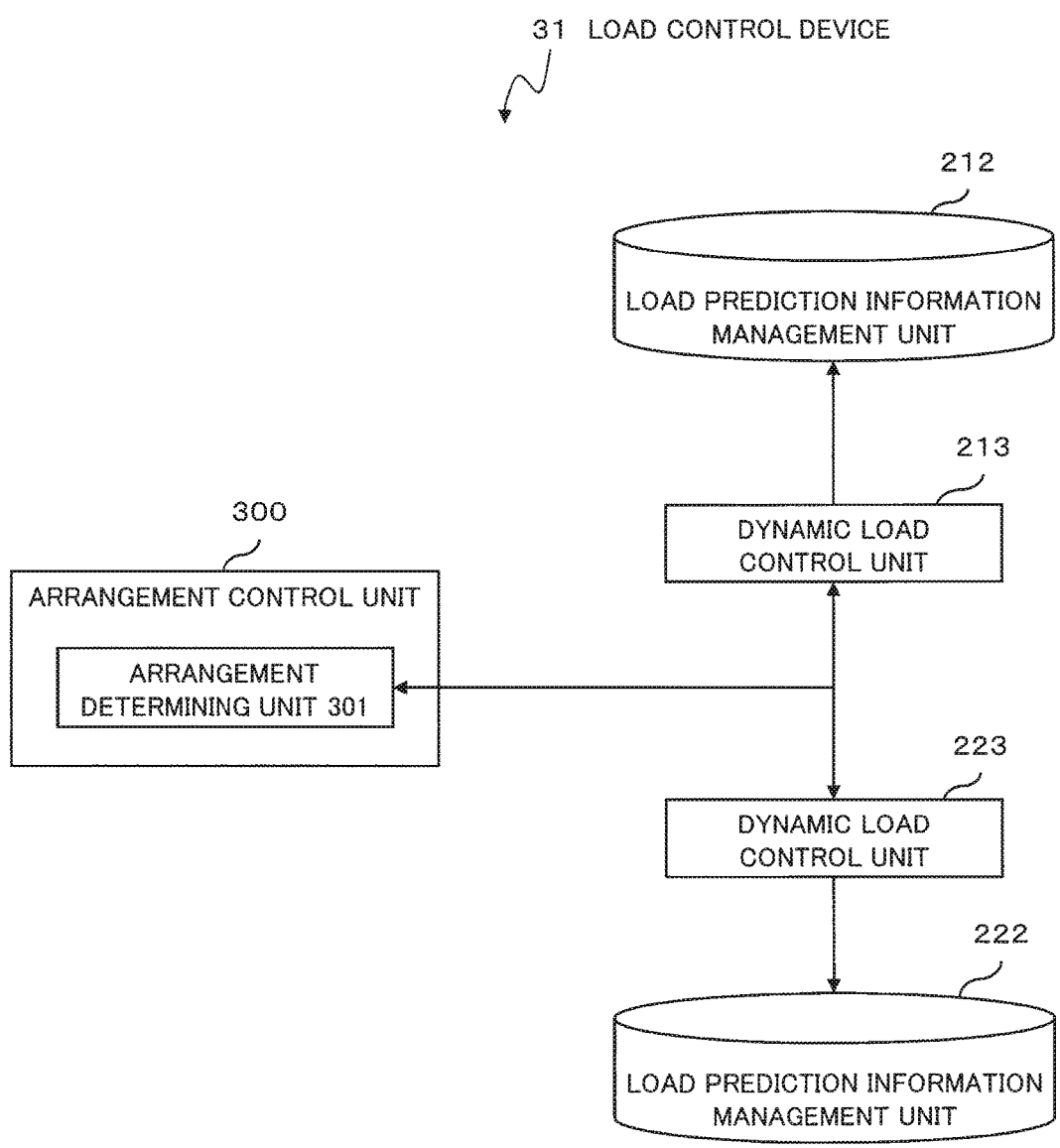
FIG. 18 is a block diagram showing a configuration of a load control device according to a third exemplary embodiment of the present invention.

FIG. 18 is a block diagram showing a configuration of a load control device 31 according to the third exemplary embodiment of the present invention.

As shown in FIG. 18, the load control device 31 of this exemplary embodiment differs from the load control device 11 of the first exemplary embodiment in that it further includes a load prediction information management unit 212 and a load prediction information management unit 222. The load control device 31 of the exemplary embodiment also differs from the load control device 11 of the first exemplary embodiment in that it includes a dynamic load control unit 213 and a dynamic load control unit 223 instead of the dynamic load control unit 211 and the dynamic load control unit 221 respectively. The load control device 31 of the present exemplary embodiment may be included in the analysis processing system 10 shown in FIG. 1 instead of the load control device 11 shown in FIG. 1.

===Load Prediction Information Management Unit 212 and Load Prediction Information Management Unit 222===

Each of a load prediction information management unit 212 and a load prediction information management unit 222 manages each control level and the load prediction value related to the control level in each of the analysis device 210 and the analysis device 220 related to the arrangement pattern determined by the arrangement control unit 300.

Figures 19, 20:
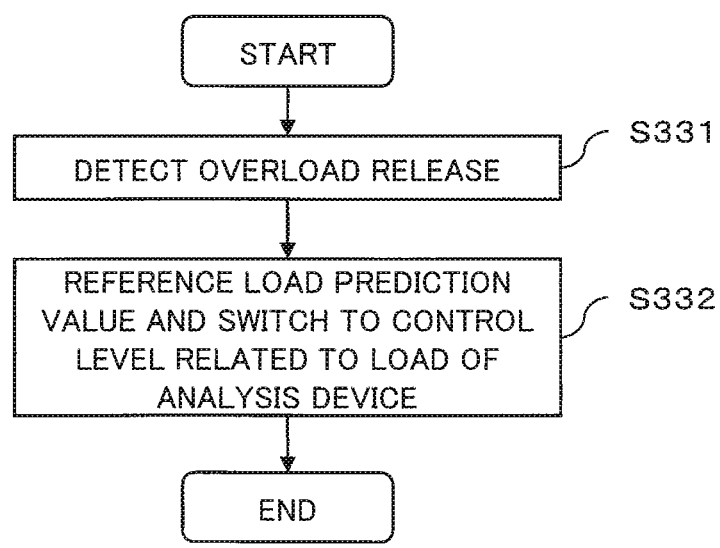
FIG. 19 shows an example of load prediction information stored in a load prediction information management unit of the third exemplary embodiment of the present invention.
FIG. 20 is a flowchart showing the operation of a dynamic load control unit of the third exemplary embodiment.

FIG. 19 shows an example of load prediction information stored in the load prediction information management unit 212. The load prediction value of load prediction information shown in FIG. 19 uses a value that represents in milliseconds the required time assumed in cases where analysis processing is executed on the unit time data by a single processor, for example, in the same way as the load information stored in the analysis load information management unit 330 in FIG. 4.

The load prediction value may be a value calculated from load information, arrangement pattern information (Columns B and C of FIG. 13) and control level information. The load information is load information stored in the analysis load information management unit 330 shown in FIG. 4. The arrangement pattern information is the arrangement pattern information (Columns B and C of FIG. 13) related to the determined arrangement pattern shown in FIG. 13. The control level information is the control level information (Columns D, E, F and I of FIG. 13) related to the determined arrangement pattern shown in FIG. 13.

For example, the load prediction value related to the control level "1" of the arrangement pattern "P4" shown in FIG. 19 is a load prediction value assumed in cases where neither a load reducing means 202 nor a load sharing means 204 is executed. Thus, the load prediction value is "350" as a total of the two values: "150" as an average of the load on a combination of a data distribution device 110 and an analysis engine a 203 and "200" as an average of the load on a combination of the data distribution device 110 and an analysis engine b 205.

For example, the load prediction value related to the control level "2" of the arrangement pattern "P4" shown in FIG. 19 is a load prediction value assumed in cases where only one load sharing means 204 is executed. Thus, the load prediction value is "250" as a total of the two values: "100" where the load on a combination of the data distribution device 110 and the analysis engine b 205 is shared by, for example, 50%; and "150" as an average of the load on a combination of the data distribution device 110 and an analysis engine a 203.

For example, the load prediction value related to the control level "3" of the arrangement pattern "P4" shown in FIG. 19 is a load prediction value assumed in cases where the load reducing means 202 and the load sharing means 204 are executed. Thus, the load prediction value is "190" as a total of the two values: "100" where the load on a combination of the data distribution device 110 and the analysis engine b 205 is shared by, for example, 50%; and "90" where an average of the load on a combination of the data distribution device 110 and the analysis engine a 203 is reduced by, for example, 40%.

The load prediction value may be a value calculated from the measurement value of analysis processing performance executed by the analysis engine a 203 and the analysis engine b 205 at each control level of each arrangement pattern. The load prediction value may be a value calculated based on a theoretical value.

===Dynamic Load Control Unit 213 and Dynamic Load Control Unit 223===

The dynamic load control unit 213 and the dynamic load control unit 223 are connected to the load prediction information management unit 212 and the load prediction information management unit 222, respectively.

Each of the dynamic load control unit 213 and the dynamic load control unit 223 controls start and stop of operation of the load control executing means further based the load prediction value for each control level stored in each of the load prediction information management unit 212 and the load prediction information management unit 222.

Next, operation of this exemplary embodiment will be detailed referring to the drawings.

FIG. 20 is a flowchart showing the operation by which each of the dynamic load control unit 213 and the dynamic load control unit 223 according to this exemplary embodiment dynamically selects and executes the load reducing means 202 and the load sharing means 204 during analysis in accordance with a drop in the load on the analysis device 200. In the description of FIG. 20 that follows, the dynamic load control unit 213 and the analysis device 210 may read the dynamic load control unit 223 and the analysis device 220, respectively.

In the third exemplary embodiment, the dynamic load control unit 213 detects the overload release status and switches the execution state of the load control executing means to the one related to the control level selected based on the load prediction information management unit 212. In the third exemplary embodiment, the dynamic load control unit 223 detects the overload release status and switches the execution state of the load control executing means to the one related to the control level selected based on the load prediction information management unit 222.

The dynamic load control unit 213 measures the load on the analysis device 210 and detects that the analysis device 210 is in the overload release status (step S331).

Next, the dynamic load control unit 213 selects a control level related to the load measured in step S331 based on the load prediction information of the load prediction information management unit 212 (step S332).

Next, the dynamic load control unit 213 switches the execution state of the load reducing means 202 and the load sharing means 204 to the one related to the selected control level (step S332).

The aforementioned effect of the exemplary embodiment is that switching is made possible to the execution state of the load reducing means 202 and the load sharing means 204 related to an appropriate control level in a relatively short time upon variations in the load on the analysis device 200.

The effect is provided because each of the dynamic load control unit 213 and the dynamic load control unit 223, on detecting the overload release status, selects a control level based on the load prediction information stored in each of the load prediction information management unit 212 and the load prediction information management unit 222.

Fourth Exemplary Embodiment

Next, a fourth exemplary embodiment of the present invention will be detailed referring to the drawings. Hereinafter, explanation overlapping the previous description is omitted as long as the explanation of this exemplary embodiment remains clear.

Figure 21:
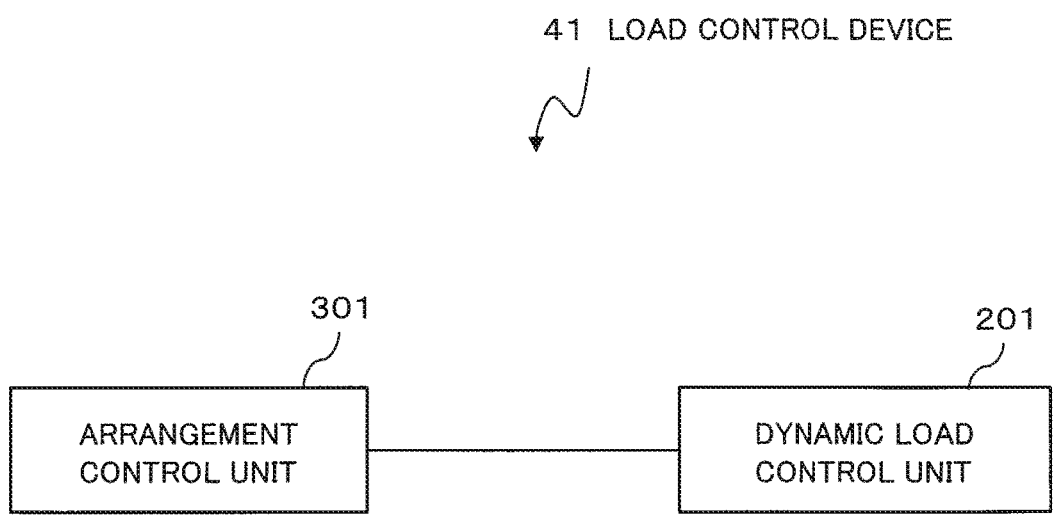
FIG. 21 is a block diagram showing a configuration of a load control device according to a fourth exemplary embodiment of the present invention.

FIG. 21 is a block diagram showing a configuration of a load control device 41 according to the fourth exemplary embodiment of the present invention.

As shown in FIG. 21, the load control device 41 of this exemplary embodiment includes an arrangement control unit 301 and a dynamic load control unit 201. The components shown in FIG. 21 may be circuits in hardware unit or components split into functional units of a computer. Here, the components shown in FIG. 21 will be described as components split into functional units of a computer.

===Arrangement Control Unit 301=

The arrangement control unit 301 determines an arrangement pattern that indicates the connection between a plurality of data distribution devices and a plurality of controlled information processing devices based on cost information. The cost information indicates price values assumed in cases where a load control executing means is executed for data processing. The data distribution device may be, for example, the data distribution device 100 shown in FIG. 1. The controlled information processing device may be, for example, the analysis device 200 shown in FIG. 1. The arrangement control unit 301 may be the arrangement control unit 300 shown in FIG. 1.

===Dynamic Load Control Unit 201===

Based on the arrangement pattern determined by the arrangement control unit 301, the dynamic load control unit 201 connects the data distribution device to the controlled information processing device. The dynamic load control unit 201 controls start and stop of operation of the load control executing means based on the cost information and the load status of the controlled information processing device. The dynamic load control unit 201 may be a combination of the dynamic load control unit 211 and the dynamic load control unit 221 shown in FIG. 1.

Next, components of hardware units in the load control device 41 will be described.

FIG. 22 shows a hardware configuration of a computer 700 that implements the load control device 41 of this exemplary embodiment.

As shown in FIG. 22, the computer 707 includes a CPU 701, a storage unit 702, a storage device 703, an input unit 704, an output unit 705 and a communication unit 706. The computer 700 further includes a recording medium (or a storage medium) 707 provided externally. For example, a recording medium 700 is a non-volatile recording medium (non-temporary recording medium) that stores information in a non-temporary fashion. The recording medium 707 may be a temporary recording medium that retains information as a signal.

The CPU 701 causes an operating system (not shown) to operate and controls the overall operation of the computer 700. For example, the CPU 701 reads the program or data from the recording medium 707 attached to the storage device 703 and writes the program or data into the storage unit 702. The program may be one that causes the computer 700 to execute the operation of the flowcharts shown in FIGS. 9 to 12, 14 and 15 given above.

The CPU 701 executes a variety of processing as an arrangement control unit 301 or a dynamic load control unit 201 shown in FIG. 21 in accordance with the readout program or based on the readout data.

The CPU 701 may download its program or data from an external computer (not shown) connected to a communications network (not shown) from the storage unit 702.

The storage unit 702 stores the program or data. The storage unit 702 may be included as a part in an analysis validation information management unit 320, an analysis load information management unit 330, a cost information management unit 340 and an analysis device resource information management unit 350. The storage unit 702 may store the information shown in FIG. 13.

The storage device 703 may be an optical disc, a flexible disk, a magneto-optical disk, an external hard disk, or a semiconductor memory. The storage device 703 stores its program in a computer-readable fashion. The storage device 703 may store its data. The storage device 703 may be included as a part in the analysis validation information management unit 320, the analysis load information management unit 330, the cost information management unit 340 or the analysis device resource information management unit 350. The storage device 703 may store the information shown in FIG. 13.

The input unit 704 accepts operation inputs by an operator or input of external information. Devices used for input operation include, for example, a mouse, a keyboard, a built-in key buttons and a touch panel. Data stored in the analysis validation information management unit 320, the analysis load information management unit 330, the cost information management unit 340 or the analysis device resource information management unit 350 may be inputted via the input unit 704.

The output unit 705 may be implemented by a display unit. The output unit 705 is used for input request or output check via the GUI (GRAPHICAL User Interface).

The communication unit 706 implements an interface to an external device. The arrangement control unit 301 may receive data stored in the analysis validation information management unit 320, the analysis load information management unit 330, the cost information management unit 340 or the analysis device resource information management unit 350 from an unillustrated external device via the communication unit 706. The dynamic load control unit 201 may transmit an instruction to start operation of the load reducing means 202 and the load sharing means 204 to the analysis device 200 via the communication unit 706. In this case, the communication unit 706 is included as a part in the dynamic load control unit 201.

As mentioned earlier, the functional unit block of the load control device 41 shown in FIG. 21 is implemented by the computer 700 in the hardware configuration shown in FIG. 22. Means for implementing each part of the computer 700 is not limited thereto. That is, the computer 700 may be implemented by a physically integrated single device or two or more physically separated devices coupled together via wired or wireless connection. For example, a first computer 700 may implement the arrangement control unit 301 while a second computer 700 may implement the dynamic load control unit 201. Each of the plurality of second computers 700 may implement each set of the analysis device 200 and the dynamic load control unit 201 related to the analysis device 200.

In cases where the recording medium 707 on which the code of the above program is recorded is supplied to the computer 700, the CPU 701 may read the program code stored on the recording medium 707 and execute the same. Alternatively, the CPU 701 may store the program code stored on the recording medium 707 into the storage unit 702, the storage device 703 or both. That is, the exemplary embodiment includes an exemplary embodiment of the recording medium 707 that stores, temporarily or non-temporarily, the program (software) executed by the computer 700 (CPU 701). A recording medium that non-temporarily stores information is also referred to as a nonvolatile recording medium.

This is the end of the description of each component in the hardware unit of the computer 700 that implements the load control device 41 of the exemplary embodiment.

The aforementioned effect of the exemplary embodiment is that a plurality of analysis engines can be efficiently executed on a plurality of controlled information processing devices.

The effect is provided by the following operations. First, the arrangement control unit 301 determines an arrangement pattern based on cost information. Secondly, the dynamic load control unit 201 connects the data distribution device to the controlled information processing device based on the arrangement pattern and controls start and stop of operation of the load control executing means based on the cost information and the load status of the controlled information processing device.

The load control device 11, the load control device 21 and the load control device 31 shown in the exemplary embodiments 1 to 3 may be implemented by the computer 700 shown in FIG. 22, similarly to the load control device 41.

For example, the analysis device 200 and the dynamic load control unit related to the analysis device 200 (such as the dynamic load control unit 211 or the dynamic load control unit 221) may be implemented as a single device by the computer 700. The arrangement control unit 300 may also be included in any one of the analysis devices 200.

While some or all of the foregoing exemplary embodiments may be described as, but not limited to, the following supplementary notes.

(Supplementary Note 1) An information processing device including:

an arrangement control unit that determines an arrangement pattern indicating connection between a plurality of data distribution devices and a plurality of controlled information processing devices based on cost information indicating price values of operation of a load control executing unit regarding data processing and a dynamic load control unit that connects the data distribution device to the controlled information processing device based on the arrangement pattern and controls start and stop of operation of the load control executing unit based on the cost information and the load status of the controlled information processing device.

(Supplementary Note 2) The information processing device according to Supplementary Note 1, wherein the load control executing unit is a load reducing unit and load sharing unit for the data processing and wherein the price values include a value that is based on the accuracy of the processing results of the data processing for operation of the load reducing unit and is based on a performance of a response to a requester of the data processing and a value that is based on traffic available and a delay in communications between the controlled information processing devices generated when the load sharing unit is executed.

(Supplementary Note 3) The information processing device according to Supplementary Note 2, wherein the arrangement control unit specifies a control level representing the stage of load control execution by the load control executing unit that takes a value higher with a growing number of operating load reducing unit and operating load sharing unit, for each of the controlled information processing devices for each of the arrangement patterns, calculates the control level cost for each of the control level based on the cost information, and determines the arrangement pattern based on a total of the control level cost for each of the arrangement patterns.

(Supplementary Note 4) The information processing device according to Supplementary Note 3, wherein the arrangement control unit calculates, as the control level cost, the value obtained by applying specific arithmetic operation by using an event probability of each of the control levels that is based on load information related to each set of a requester of the data processing and a processing unit in the controlled information processing device on the total value of the cost of the load reducing unit and the cost information of the load sharing unit related to each of the control levels.

(Supplementary Note 5) The information processing device according to Supplementary Notes 3 or 4, wherein the arrangement control unit calculates the control level cost further based on the effect obtained by operation of the load reducing unit and the effect obtained by operation of the load sharing unit.

(Supplementary Note 6) The information processing device according to any one of Supplementary Notes 3 through 5, wherein the dynamic load control unit selects the control level with the relatively small control level cost without overload occurring in the controlled information processing device and controls start and stop of operation of the load control executing unit based on the selected control level.

(Supplementary Note 7) The information processing device according to Supplementary Note 6, wherein the dynamic load control unit, when detecting that the load status is the overload status, sequentially repeats the operation of switching the execution stage of the load control to a state that is based on the control level of the stage taking a next higher value until the load status is out of the overload status, and wherein the dynamic load control unit, when detecting that the load status is the overload release status, sequentially repeats the operation of switching the execution stage to a state that is based on the control level of the stage taking a next lower value until the load status is out of the overload release status.

(Supplementary Note 8) The information processing device according to Supplementary Note 6, wherein the dynamic load control unit, upon detection of the overload release status, when detecting that the load status is the overload status, sequentially repeats the operation of switching the execution stage of the load control executing unit to a state that is based on the control level of the stage taking a next higher value until the load status is out of the overload status, and wherein the dynamic load control unit, when detecting that the load status is the overload release status, selects the control level based on the load status of the controlled information processing device and load prediction information for each of the control levels based on the load information and switches the execution stage of the load control to a state that is based on the selected control level.

(Supplementary Note 9) The information processing device of any one of the Supplementary Notes 3 to 8, wherein the dynamic load control unit, in the absence of the controlled information processing device operating at the control level with a control level cost lower than the control level cost related to the selected control level, switches the execution stage of the load control to a state that is based on a temporary control level where the load sharing means is omitted from the selected control level and only the load division means operates.

(Supplementary Note 10) A load control method wherein a computer determines an arrangement pattern indicating connection between a plurality of data distribution devices and a plurality of controlled information processing devices based on cost information indicating price values of operation of a load control executing unit regarding data processing, connects the data distribution device to the controlled information processing device based on the arrangement pattern and controls start and stop of operation of the load control executing unit based on the cost information and a load status of the controlled information processing device.

(Supplementary Note 11) A program that causes a computer to determine an arrangement pattern indicating connection between a plurality of data distribution devices and a plurality of controlled information processing devices based on cost information indicating price values of operation of a load control executing unit regarding data processing, connect the data distribution device to the controlled information processing device based on the arrangement pattern and control start and stop of operation of the load control executing unit based on the cost information and a load status of the controlled information processing device.

(Supplementary Note 12) An information processing device that includes a processor and a storage unit that retains instructions executed by the processor for the processor to operate as an arrangement control unit and a dynamic load control unit, wherein the arrangement control unit determines an arrangement pattern indicating connection between a plurality of data distribution devices and a plurality of controlled information processing devices based on cost information indicating price values of operation of a load control executing means regarding data processing and wherein the dynamic load control unit connects the data distribution device to the controlled information processing device based on the arrangement pattern and controls start and stop of operation of the load control executing means based on the cost information and a load status of the controlled information processing device.

(Supplementary Note 13) A computer-readable nonvolatile, non-temporary recording medium that records a program that causes a computer to determine an arrangement pattern indicating connection between a plurality of data distribution devices and a plurality of controlled information processing devices based on cost information indicating price values of operation of a load control executing unit regarding data processing, connect the data distribution device to the controlled information processing device based on the arrangement pattern and control start and stop of operation of the load control executing unit based on the cost information and a load status of the controlled information processing device.

The exemplary embodiments described above are preferable exemplary embodiments of the present invention and the scope of the present invention is not limited to the above exemplary embodiments. The present invention may be implemented in forms to which various modifications a skilled person in the art will readily understand have been applied, without departing from the spirit of the present invention.

This application claims priority based on Japanese Patent Application No. 2014-028456 filed on Feb. 18, 2014, the entire disclosure of which is incorporated herein.

REFERENCE SIGNS LIST

10 Analysis processing system
11 Load control device
21 Load control device
31 Load control device
100 Data distribution device
110 Data distribution device
120 Data distribution device
130 Data distribution device
200 Analysis device
202 Load reducing means
203 Analysis engine a
204 Load sharing means
205 Analysis engine b
210 Analysis device
211 Dynamic load control unit
212 Load prediction information management unit
213 Dynamic load control unit
220 Analysis device
221 Dynamic load control unit
222 Load prediction information management unit
223 Dynamic load control unit
300 Arrangement control unit
302 Arrangement control unit
304 Analysis device resource information management unit
310 Arrangement determining unit
312 Arrangement determining unit
320 Analysis validation information management unit
330 Analysis load information management unit
340 Cost information management unit
342 Cost information management unit
350 Analysis device resource information management unit
701 CPU
702 Storage unit
703 Storage device
704 Input unit
705 Output unit
706 Communication unit
707 Recording medium

What is claimed is:

1. An information processing device comprising:
a memory storing instructions; and
at least one processor configured to process the instructions to:
when executing a load control regarding data processing;
determine an arrangement pattern indicating a connection relationship between a plurality of data distribution devices and a plurality of controlled information processing devices, based on cost information indicating values to be balanced by operation of the load control; and
execute a dynamic load control that connects a respective one of the plurality of data distribution devices to a corresponding one of the plurality of controlled information processing devices based on the arrangement pattern and controls start and stop of operation of the load control based on the cost information and a load status of the corresponding one of the plurality of controlled information processing devices;
wherein
the executing the load control includes a load reducing and load sharing for the data processing and wherein the values to be balanced include
a value based on results of the data processing for operation of the load reducing and a performance of a response to a requester of the data processing and
a value based on traffic availability and a delay in communications between the controlled information processing devices generated when the load sharing is executed;
wherein the processor is further configured to:
in the determining the arrangement pattern,
specify a control level representing a stage of load control execution in the load control for each of the controlled information processing devices and for each of the arrangement patterns, wherein the stage becomes higher as a number of operating the load reducing and operating the load sharing increases, for each of the controlled information processing devices for each of the arrangement patterns,
calculate a control level cost for each of the control levels based on the cost information, and
determine the arrangement pattern based on a total of the control level costs calculated for the arrangement pattern.

2. The information processing device according to claim 1, wherein the processor is further configured to:
in the determining the arrangement pattern,
calculate the control level based on a total value of costs of the load reducing and the load sharing, for each of the control levels by using an event probability for each of the control levels, wherein
the control levels are generated based on load information corresponding to each set of a requester of the data processing and a processing means in the controlled information processing device on the total value of the cost of the load reducing and the cost information of the load sharing related to each of the control levels.

3. The information processing device according to claim 1, wherein the processor is further configured to: in the determining the arrangement pattern, calculate the control level cost further based on an effect obtained by operation of the load reducing and an effect obtained by operation of the load sharing.

4. The information processing device according to claim 2, wherein the processor is further configured to:
in the determining the arrangement pattern,
calculate the control level cost further based on an effect obtained by operation of the load reducing an effect obtained by operation of the load sharing.

5. The information processing device according to claim 1, wherein the processor is further configured to:
in the execution of the dynamic load control,
select the control level with a relatively small control level cost without overload occurring in the controlled information processing device and control start and stop of operation of the load control based on the selected control level.

6. The information processing device according to claim 2, wherein the processor is further configured to:
in the execution of the dynamic load control,
select the control level with a relatively small control level cost without overload occurring in the controlled information processing device and
control start and stop of operation of the load control based on the selected control level.

7. The information processing device according to claim 3, wherein the processor is further configured to:
in the execution of the dynamic load control,
select the control level with a relatively small control level cost without overload occurring in the controlled information processing device and
control start and stop of operation of the load control based on the selected control level.

8. The information processing device according to claim 4, wherein the processor is further configured to:
in the execution of the dynamic load control,
when detecting that the load status is an overload status, sequentially repeat an operation of switching an execution stage of the load control to a state that is based on the control level of the stage taking a next higher value until the load status is out of the overload status, and
in the dynamic load control, when detecting that the load status is an overload release status, sequentially repeat an operation of switching the execution stage of the load control to a state that is based on the control level of the stage taking a next lower value until the load status is out of the overload release status.

9. The information processing device according to claim 4, wherein the processor is further configured to:
in the dynamic load control,
upon detection of an overload release status, when detecting that the load status is an overload status, sequentially repeat the operation of switching an execution stage of the load control to a state that is based on the control level of the stage taking a next higher value until the load status is out of the overload status, and
in the dynamic load control,
when detecting that the load status is the overload release status,
select the control level based on the load status of the controlled information processing device and load prediction information for each of the control levels based on the load information and
switch the execution stage of the load control to a state that is based on the selected control level.

10. A load control method comprising:
determining an arrangement pattern indicating a connection relationship between a plurality of data distribution devices and a plurality of controlled information processing devices, based on cost information indicating values to be balanced by operation of a load control regarding data processing,
connecting a respective one of the plurality of data distribution devices to a corresponding one of the plurality of controlled information processing devices based on the arrangement pattern and
controlling start and stop of operation of the load control-based on the cost information and a load status of the corresponding one of the plurality of controlled information processing devices;
wherein
the connecting includes a load reducing and load sharing for the data processing and wherein
the values to be balanced include
a value based on results of the data processing for operation of the load reducing and a performance of a response to a requester of the data processing and
a value based on traffic availability and a delay in communications between the controlled information processing devices generated when the load sharing is executed;
wherein the determining the arrangement pattern is further configured to,
specify a control level representing a stage of load control execution in the load control for each of the controlled information processing devices and for each of the arrangement patterns, wherein the stage becomes higher as a number of operating the load reducing and operating the load sharing increases, for each of the controlled information processing devices for each of the arrangement patterns,
calculate a control level cost for each of the control levels based on the cost information, and
determine the arrangement pattern based on a total of the control level costs calculated for the arrangement pattern.

11. A computer-readable nonvolatile, non-temporary recording medium that records a program that causes a computer to:
determine an arrangement pattern indicating a connection relationship between a plurality of data distribution devices and a plurality of controlled information processing devices based on cost information indicating values to be balanced by operation of a load control-regarding data processing, connect a respective one of the plurality of data distribution devices to a corresponding one of the plurality of controlled information processing devices based on the arrangement pattern and control start and stop of operation of the load control- based on the cost information and a load status of the corresponding one of the plurality of controlled information processing devices;

wherein the connect a respective one of the plurality of data distribution devices includes a load reducing and load sharing for the data processing and wherein the values to be balanced include
- a value based on results of the data processing for operation of the load reducing and a performance of a response to a requester of the data processing and
- a value based on traffic availability and a delay in communications between the controlled information processing devices generated when the load sharing is executed;

wherein the determine the arrangement pattern is further configured to, specify a control level representing a stage of load control execution in the load control for each of the controlled information processing devices and for each of the arrangement patterns, wherein the stage becomes higher as a number of operating the load reducing and operating the load sharing increases, for each of the controlled information processing devices for each of the arrangement patterns.

* * * * *